US011431100B2

(12) United States Patent
Galla et al.

(10) Patent No.: US 11,431,100 B2
(45) Date of Patent: Aug. 30, 2022

(54) ANTENNAS HAVING LENSES FORMED OF LIGHTWEIGHT DIELECTRIC MATERIALS AND RELATED DIELECTRIC MATERIALS

(71) Applicant: CommScope Technologies LLC, Hickory, NC (US)

(72) Inventors: Matthew P. Galla, Holly Springs, NC (US); Christiaan Radelet, Aarschot (BE); Hans Bols, Geel (BE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/882,505

(22) Filed: Jan. 29, 2018

(65) Prior Publication Data

US 2018/0166789 A1    Jun. 14, 2018

Related U.S. Application Data

(63) Continuation-in-part of application No. 15/464,442, filed on Mar. 21, 2017, now Pat. No. 11,283,186.
(Continued)

(51) Int. Cl.
*H01Q 15/08* (2006.01)
*H01Q 19/06* (2006.01)
(Continued)

(52) U.S. Cl.
CPC ............. *H01Q 15/08* (2013.01); *H01Q 1/246* (2013.01); *H01Q 19/062* (2013.01); *H04W 16/28* (2013.01)

(58) Field of Classification Search
CPC ...... H01Q 19/062; H01Q 1/246; H01Q 15/10; H01Q 19/108; H01Q 21/24; H01Q 25/008; H01Q 15/08; H04W 16/28
See application file for complete search history.

(56) References Cited

U.S. PATENT DOCUMENTS 2,883,347 A    4/1959  Fisher
3,083,124 A    3/1963  Rahmes
(Continued)

FOREIGN PATENT DOCUMENTS

EP    0309982 A2    4/1982
EP    1730811 B1    1/2012
(Continued)

OTHER PUBLICATIONS

Brosseau et al. "Dielectric and microstructure properties of polymer carbon black composites, J. Appl. Phys. 81 (2), Jan. 15, 1997"(Year: 1997).*
(Continued)

*Primary Examiner* — Dimary S Lopez Cruz
*Assistant Examiner* — Bamidele A Jegede
(74) *Attorney, Agent, or Firm* — Myers Bigel, P.A.

(57) ABSTRACT

Lensed antennas are provided that include a plurality of radiating elements and a lens positioned to receive electromagnetic radiation from at least one of the radiating elements, the lens comprising a composite dielectric material. The composite dielectric material comprises expandable gas-filled microspheres that are mixed with an inert binder, dielectric support materials such as foamed microspheres and particles of conductive material that are mixed together.

11 Claims, 10 Drawing Sheets

Related U.S. Application Data

(60) Provisional application No. 62/313,406, filed on Mar. 25, 2016.

(51) Int. Cl.
*H01Q 1/24* (2006.01)
*H04W 16/28* (2009.01)

(56) References Cited

U.S. PATENT DOCUMENTS

| | | | |
|---|---|---|---|
| 3,243,483 A | 3/1966 | Marshall | |
| 3,254,345 A | 5/1966 | Hannan | |
| 3,359,560 A | 12/1967 | Horst | |
| 3,917,773 A * | 11/1975 | Gates, Jr. | H01Q 15/08 264/44 |
| 4,288,337 A * | 9/1981 | Ota | H01Q 15/08 252/512 |
| 4,482,513 A * | 11/1984 | Auletti | B29C 44/40 249/141 |
| 4,588,443 A * | 5/1986 | Bache | C04B 18/146 106/644 |
| 4,613,784 A | 9/1986 | Haun et al. | |
| 4,973,965 A | 11/1990 | Ridge et al. | |
| 4,980,233 A | 12/1990 | McCullough et al. | |
| 5,047,776 A * | 9/1991 | Baller | G01S 3/043 342/52 |
| 5,154,973 A * | 10/1992 | Imagawa | H01Q 15/08 428/325 |
| 5,476,612 A * | 12/1995 | Wessling | C08K 3/08 524/495 |
| 5,498,644 A * | 3/1996 | Reo | C08J 9/32 524/588 |
| 5,677,045 A | 10/1997 | Nagai et al. | |
| 5,677,796 A * | 10/1997 | Zimmerman | G02B 3/0087 359/654 |
| 5,785,913 A * | 7/1998 | Clark, Jr. | H01B 1/22 156/272.4 |
| 5,879,794 A * | 3/1999 | Korleski, Jr. | B32B 5/28 428/317.1 |
| 5,904,978 A * | 5/1999 | Hanrahan | C08L 27/18 428/313.5 |
| 5,958,794 A * | 9/1999 | Bruxvoort | B24B 7/228 438/692 |
| 6,036,893 A | 3/2000 | Lier et al. | |
| 6,166,109 A * | 12/2000 | Spitler | C08J 9/146 521/137 |
| 6,195,058 B1 | 2/2001 | Nakamura et al. | |
| 6,241,914 B1 * | 6/2001 | Schleifstein | C08K 9/02 428/407 |
| 6,266,029 B1 * | 7/2001 | Lee | G06N 3/126 343/911 L |
| 6,365,973 B1 * | 4/2002 | Koning | H05K 3/3436 257/772 |
| 6,433,936 B1 * | 8/2002 | Carpenter | B29C 39/025 264/1.7 |
| 6,489,928 B2 * | 12/2002 | Sakurada | H01B 3/12 343/753 |
| 6,562,448 B1 | 5/2003 | Chamberlain et al. | |
| 6,660,193 B2 * | 12/2003 | Myhre | B29D 11/00009 264/1.32 |
| 6,781,487 B2 | 8/2004 | Hattori et al. | |
| 6,855,426 B2 * | 2/2005 | Yadav | B29B 9/08 428/404 |
| 7,037,865 B1 | 5/2006 | Kimberly | |
| 7,068,898 B2 | 6/2006 | Buretea et al. | |
| 7,113,146 B2 | 9/2006 | Pearlman et al. | |
| 7,235,502 B2 † | 6/2007 | Kalpat | |
| 7,268,637 B2 | 9/2007 | Aisenbrey | |
| 7,317,420 B2 | 1/2008 | Aisenbrey | |
| 7,365,395 B2 | 4/2008 | Stumbo et al. | |
| 7,592,957 B2 | 9/2009 | Achour et al. | |
| 8,089,152 B2 | 1/2012 | Miller | |
| 8,271,241 B2 | 9/2012 | Akyurtlu et al. | |
| 8,320,727 B1 * | 11/2012 | Jacobsen | F28D 20/023 385/129 |
| 8,378,877 B2 † | 2/2013 | Tishin | |
| 8,518,537 B2 † | 8/2013 | Matitsine | |
| 8,558,311 B2 | 10/2013 | Dubrow et al. | |
| 8,765,230 B1 * | 7/2014 | Waldrop, III | H01Q 1/42 427/402 |
| 9,630,381 B2 | 4/2017 | Millett | |
| 9,728,860 B2 † | 8/2017 | Matitsine | |
| 9,819,094 B2 † | 11/2017 | Matitsine | |
| 2001/0020752 A1 | 9/2001 | Schryvers et al. | |
| 2001/0022560 A1 * | 9/2001 | Hirtzlin | H01Q 15/10 343/753 |
| 2001/0029119 A1 * | 10/2001 | Chung | H01Q 1/36 439/91 |
| 2002/0001701 A1 | 1/2002 | Matsunaga | |
| 2002/0003505 A1 | 1/2002 | Ebling et al. | |
| 2002/0094426 A1 * | 7/2002 | Stepanian | C04B 14/064 428/292.1 |
| 2003/0002045 A1 * | 1/2003 | Nemat-Nasser | H01Q 15/148 356/445 |
| 2003/0027910 A1 | 2/2003 | Misra et al. | |
| 2003/0153635 A1 * | 8/2003 | Spitler | C08J 9/32 521/50 |
| 2003/0158294 A1 * | 8/2003 | Chaudhuri | C08K 3/08 523/205 |
| 2004/0029985 A1 * | 2/2004 | Aki | C08J 9/0066 521/99 |
| 2004/0051666 A1 | 3/2004 | Aisenbrey | |
| 2004/0104847 A1 * | 6/2004 | Killen | H01Q 9/0442 343/700 MS |
| 2004/0174318 A1 * | 9/2004 | Aisenbrey | H01Q 9/32 343/897 |
| 2004/0174651 A1 | 9/2004 | Aisenbrey | |
| 2005/0022905 A1 | 2/2005 | Wong et al. | |
| 2005/0025956 A1 * | 2/2005 | Bainbridge | B29C 70/58 428/317.3 |
| 2005/0100728 A1 * | 5/2005 | Ristic-Lehmann | C08K 3/36 428/323 |
| 2005/0287352 A1 * | 12/2005 | Myers | H01L 23/4275 428/323 |
| 2006/0003152 A1 * | 1/2006 | Youngs | H01B 1/22 428/212 |
| 2006/0028386 A1 * | 2/2006 | Ebling | H01Q 19/062 343/754 |
| 2006/0083948 A1 * | 4/2006 | Kawaguchi | H01F 41/18 428/692.1 |
| 2007/0066198 A1 * | 3/2007 | Rambosek | B24D 9/08 451/533 |
| 2007/0216596 A1 * | 9/2007 | Lewis | H01Q 19/062 343/848 |
| 2008/0048921 A1 * | 2/2008 | Rebeiz | H01Q 19/30 343/754 |
| 2008/0058467 A1 | 3/2008 | Takagi et al. | |
| 2008/0108717 A1 * | 5/2008 | Tokoro | C04B 26/045 521/56 |
| 2008/0224937 A1 * | 9/2008 | Kimura | H01F 41/16 343/787 |
| 2008/0248283 A1 | 10/2008 | Golner et al. | |
| 2008/0278394 A1 | 11/2008 | Koh et al. | |
| 2009/0045195 A1 * | 2/2009 | Djerf | E04B 1/34846 220/62.11 |
| 2009/0226696 A1 * | 9/2009 | Simpson | C08J 9/0066 428/304.4 |
| 2010/0189884 A1 * | 7/2010 | Kaiser | H01B 13/16 427/118 |
| 2010/0231433 A1 * | 9/2010 | Tishin | C04B 38/02 342/1 |
| 2010/0236596 A1 | 9/2010 | Lee et al. | |
| 2010/0266862 A1 * | 10/2010 | Lugg | B24D 18/0072 428/551 |
| 2011/0003131 A1 * | 1/2011 | Matitsine | C08J 9/0085 428/296.4 |
| 2011/0059362 A1 * | 3/2011 | West | H01M 4/1395 429/219 |

(56) References Cited

U.S. PATENT DOCUMENTS

| | | | |
|---|---|---|---|
| 2011/0155945 A1* | 6/2011 | Soong | C08K 3/08 |
| | | | 252/62.54 |
| 2011/0155946 A1 | 6/2011 | Simpson | |
| 2011/0205119 A1 | 8/2011 | Timofeev et al. | |
| 2011/0217544 A1* | 9/2011 | Young | B29C 37/0032 |
| | | | 428/327 |
| 2011/0236672 A1 | 9/2011 | Hiroshi et al. | |
| 2011/0260936 A1* | 10/2011 | Leung | H01L 31/0525 |
| | | | 343/720 |
| 2012/0245016 A1* | 9/2012 | Curry | C04B 35/4682 |
| | | | 501/137 |
| 2013/0056244 A1* | 3/2013 | Srinivas | H05K 1/09 |
| | | | 174/250 |
| 2013/0088406 A1* | 4/2013 | Hamada | H01Q 1/36 |
| | | | 343/893 |
| 2013/0118773 A1 | 5/2013 | Liu et al. | |
| 2014/0139370 A1* | 5/2014 | Hamner | H01Q 21/0031 |
| | | | 342/175 |
| 2015/0002352 A1 | 1/2015 | Merlet et al. | |
| 2015/0042526 A1 | 2/2015 | Zeine | |
| 2015/0070230 A1* | 3/2015 | Bradley | H01Q 21/08 |
| | | | 343/753 |
| 2015/0091767 A1* | 4/2015 | Matitsine | H01Q 1/42 |
| | | | 343/755 |
| 2015/0325348 A1† | 11/2015 | Matitsine | |
| 2016/0083583 A1 | 3/2016 | Wilenski et al. | |
| 2016/0083871 A1 | 3/2016 | Meure et al. | |
| 2016/0194459 A1 | 7/2016 | Kozar et al. | |
| 2017/0043552 A1* | 2/2017 | Lenzi | B32B 5/06 |
| 2017/0203552 A1* | 7/2017 | D'Arcy | B32B 27/322 |
| 2017/0324171 A1* | 11/2017 | Shehan | H01Q 1/246 |

FOREIGN PATENT DOCUMENTS

| | | |
|---|---|---|
| GB | 665747 | 1/1952 |
| GB | 1125828 | 9/1968 |
| JP | 53-026996 | 3/1978 |
| JP | 2000272020 A | 10/2000 |
| JP | 2001-316514 A | 11/2001 |
| WO | WO 2002/102584 A1 | 12/2002 |
| WO | 2005002841 | 1/2005 |
| WO | 2005002841 A1 † | 1/2005 |
| WO | WO 2005/002841 A1 | 1/2005 |
| WO | 2017027569 A1 | 2/2017 |

OTHER PUBLICATIONS

Notification Concerning Transmittal of International Preliminary Report on Patentability, corresponding to International Application No. PCT/US2017/023297, dated Oct. 4, 2018, 18 pages.

\* cited by examiner
† cited by third party

ANTENNAS HAVING LENSES FORMED OF LIGHTWEIGHT DIELECTRIC MATERIALS AND RELATED DIELECTRIC MATERIALS

CROSS-REFERENCE TO RELATED APPLICATION

The present application claims priority under 35 U.S.C. § 120 as a continuation-in-part application of U.S. patent application Ser. No. 15/464,442, filed Mar. 21, 2017, which in turn claims priority under 35 U.S.C. § 119 to U.S. Provisional Patent Application Ser. No. 62/313,406, filed Mar. 25, 2016, the entire content of each of which is incorporated herein by reference.

BACKGROUND

The present invention generally relates to radio communications and, more particularly, to lensed antennas utilized in cellular and other communications systems.

Cellular communications systems are well known in the art. In a cellular communications system, a geographic area is divided into a series of regions that are referred to as "cells," and each cell is served by a base station. The base station may include one or more antennas that are configured to provide two-way radio frequency ("RF") communications with mobile subscribers that are geographically positioned within the cells served by the base station. In many cases, each base station provides service to multiple "sectors," and each of a plurality of antennas will provide coverage for a respective one of the sectors. Typically, the sector antennas are mounted on a tower or other raised structure, with the radiation beam(s) that are generated by each antenna directed outwardly to serve the respective sector.

A common wireless communications network plan involves a base station serving three hexagonally shaped cells using three base station antennas. This is often referred to as a three-sector configuration. In a three-sector configuration, each base station antenna serves a 120° sector. Typically, a 65° azimuth Half Power Beamwidth (HPBW) antenna provides coverage for a 120° sector. Three of these 120° sectors provide 360° coverage. Other sectorization schemes may also be employed. For example, six, nine, and twelve sector configurations are also used. Six sector sites may involve six directional base station antennas, each having a 33° azimuth HPBW antenna serving a 60° sector. In other proposed solutions, a single, multi-column array may be driven by a feed network to produce two or more beams from a single phased array antenna. For example, if multi-column array antennas are used that each generate two beams, then only three antennas may be required for a six-sector configuration. Antennas that generate multiple beams are disclosed, for example, in U.S. Patent Publication No. 2011/0205119, which is incorporated herein by reference.

Increasing the number of sectors increases system capacity because each antenna can service a smaller area and therefore provide higher antenna gain throughout the sector and because frequency bands may be reused for each sector. However, dividing a coverage area into smaller sectors has drawbacks because antennas covering narrow sectors generally have more radiating elements that are spaced wider apart than are the radiating elements of antennas covering wider sectors. For example, a typical 33° azimuth HPBW antenna is generally twice as wide as a typical 65° azimuth HPBW antenna. Thus, cost, space and tower loading requirements increase as a cell is divided into a greater number of sectors.

Lenses may be used in cellular and other communications systems to focus an antenna beam, which can be useful for increasing the number of sectors served by a cellular base station, and which may be useful in other communications systems for focusing the antenna beam on an area of interest. Lenses, however, may increase the cost, weight and/or complexity of the antenna and hence may not be commercially practical solutions in many antenna applications.

SUMMARY

Pursuant to embodiments of the present invention, antennas are provided that include a plurality of radiating elements and a lens positioned to receive electromagnetic radiation from at least one of the radiating elements. The lens comprises a plurality of blocks of a composite dielectric material, where at least some of the blocks of the composite dielectric material comprise first and second sheets of a base dielectric material having a first metal sheet therebetween, wherein a thickness of the first metal sheet is less than 10% of a thickness of the first sheet.

In some embodiments, at least some of the first metal sheets may have a thickness of less than 50 microns. In some embodiments, at least some of the first metal sheets may comprise an aluminum foil. In some embodiments, lengths of at least some of the first metal sheets may be within 50% of widths of the respective first metal sheets.

In some embodiments, at least some of the first sheets of dielectric material may comprise foamed materials that expand in volume when heated.

In some embodiments, the at least some of the blocks of the composite dielectric material may each further comprise a third sheet of dielectric material on the second sheet of dielectric material and a second metal sheet in between the second and third sheets of dielectric material.

In some embodiments, the lens may comprise a spherical lens, and the antenna may comprise a base station antenna for a cellular communications system.

Pursuant to further embodiments of the present invention, lensed antennas are provided that include a plurality of radiating elements and a lens positioned to receive electromagnetic radiation from at least one of the radiating elements, the lens comprising a composite dielectric material. The composite dielectric material comprises a plurality of expandable gas-filled microspheres and a plurality of particles of conductive material interspersed between the expandable gas-filled microspheres.

In some embodiments, the lensed antenna may further include a binder such as, for example, an oil.

In some embodiments, the particles of conductive material may be larger in at least one dimension than the expandable gas-filled microspheres.

In some embodiments, the particles of conductive material may comprise glitter and/or flitter.

In some embodiments, the particles of conductive material may each comprise a thin metal sheet having a thickness at least ten times smaller the sum of a length and a width of the thin metal sheet, the thin metal sheet having an insulating material on either major face thereof.

In some embodiments, the expandable gas-filled microspheres may have essentially hollow centers once expanded.

In some embodiments, the lens may comprise a spherical lens.

Pursuant to still further embodiments of the present invention, lensed antennas are provided that include a plurality of radiating elements and a lens positioned to receive electromagnetic radiation from at least one of the radiating elements, the lens comprising a lens container and a composite dielectric material. The composite dielectric material may comprise one or more bent wires that fill the lens container.

In some embodiments, each of the one or more bent wires includes an insulating outer layer.

In some embodiments, each of the one or more bent wires comprises a rigid wire that maintains its shape.

Pursuant to still further embodiments of the present invention, lensed antennas are provided that include a plurality of radiating elements and a lens positioned to receive electromagnetic radiation from at least one of the radiating elements, the lens comprising a composite dielectric material. The composite dielectric material comprises sheets of a high dielectric constant material combined with a low dielectric constant material.

In some embodiments, the sheets may comprise crumpled sheets of a high dielectric constant plastic combined with a gas filler (e.g., air) in a lens container.

In some embodiments, the sheets may comprise crumpled elongated strips of a high dielectric constant plastic combined with air in a lens container.

In some embodiments, the sheets of high dielectric constant material may be rolled together with the low dielectric constant material.

In some embodiments, the antenna may be an array antenna that includes at least one column of radiating elements. In other embodiments, the antenna may be a parabolic reflector antenna.

In some embodiments, a beamwidth of an antenna beam generated by each radiating element may increase as a function of frequency.

In some embodiments, the beamwidth of the antenna beam generated by each radiating element may increase at approximately the same rate at which the lens decreases the beamwidth of the antenna beam as a function of frequency.

Pursuant to still further embodiments of the present invention, lensed antennas are provided that include an array of radiating elements and a lens positioned to receive electromagnetic radiation from at least one of the radiating elements. The lens comprises a composite dielectric material that includes a reticular foamed material, a binder and particles of a second constant material that has a dielectric constant that is higher than a dielectric constant of the reticular foamed material, the particles of the second dielectric material dispersed throughout the interior of the reticular foamed material.

In some embodiments, the particles of the second dielectric constant material may comprise at least one of carbon black particles, ceramic dielectric particles and non-conductive metal oxide particles.

In some embodiments, the binder may be an oil.

In some embodiments, the reticular foamed material may have an open cell structure and the binder material may bind the particles of the second dielectric constant material to the reticular foamed material.

Pursuant to additional embodiments of the present invention, lensed antennas are provided that include an array of radiating elements and a lens positioned to receive electromagnetic radiation from at least one of the radiating elements. The lens comprises a composite dielectric material that includes a reticular foamed material, a binder and conductive particles dispersed throughout the interior of the reticular foamed material.

In some embodiments, the conductive particles may comprise, for example, glitter flakes, flitter flakes, metal particles and/or chopped insulated wire pieces, and the binder may be an oil.

In some embodiments, the reticular foamed material may have an open cell structure and the binder material may bind the conductive particles to the reticular foamed material.

Pursuant to other embodiments of the present invention, lensed antennas are provided that include a plurality of radiating elements and a lens positioned to receive electromagnetic radiation from at least one of the radiating elements. The lens comprises a composite dielectric material that includes a plurality of particles of a first dielectric material interspersed between a plurality of foamed dielectric particles, where the first dielectric material has a higher dielectric constant than the foamed dielectric material.

In some embodiments, the foamed dielectric particles may be equiaxed foamed dielectric particles.

In some embodiments, the first dielectric material may be, for example, carbon black and/or a ceramic dielectric powder.

Pursuant to additional embodiments of the present invention, antennas are provided that include a plurality of radiating elements and a lens positioned to receive electromagnetic radiation from at least one of the radiating elements. The lens comprises a plurality of blocks of a composite dielectric material. At least some of the blocks of the composite dielectric material comprise a first sheet of dielectric material and a second sheet of dielectric material having a third sheet of dielectric material therebetween, where a thickness of the third sheet of dielectric material is less than 10% of a thickness of the first sheet of dielectric material and less than 10% of a thickness of the sheet of dielectric material.

In some embodiments, a third dielectric constant of the third sheet of dielectric material is higher than a first dielectric constant of the first sheet of dielectric material and is higher than a second dielectric constant of the second sheet of dielectric material. In some embodiments, the first and second sheets of dielectric material may be sheets of foamed dielectric material.

Pursuant to other embodiments of the present invention, lensed antennas are provided that include a plurality of radiating elements and a lens positioned to receive electromagnetic radiation from at least one of the radiating elements. The lens comprises a composite dielectric material that includes a plurality of a plurality of expandable gas-filled microspheres, a binder and a plurality of particles of a first dielectric material interspersed between the expandable gas-filled microspheres. The first dielectric material may comprise, for example, carbon black powder or a ceramic dielectric powder.

Pursuant to still other embodiments of the present invention, lensed antennas are provided that include an array of radiating elements and a lens positioned to receive electromagnetic radiation from at least one of the radiating elements. The lens comprises a composite dielectric material that includes a cured foamed polymer material having a cellular structure and either or both particles of a high dielectric constant material or conductive particles dispersed throughout the interior of the cured foamed polymer material.

DETAILED DESCRIPTION

Figure 1A:
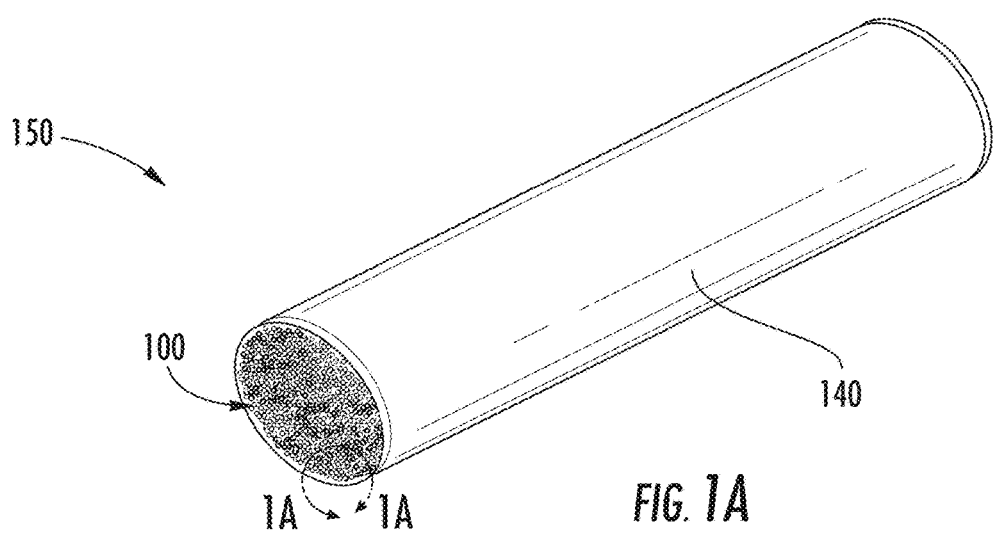
FIG. 1A is a schematic perspective view of an RF lens for an antenna, the RF lens including a composite dielectric material according to embodiments of the present invention.

Antennas have been developed that have multi-beam beam forming networks that drive a planar array of radiating elements, such as a Butler matrix. Multi-beam beam forming networks, however, have several potential disadvantages, including non-symmetrical beams and problems associated with port-to-port isolation, gain loss, and/or a narrow bandwidth. Multi-beam antennas have also been proposed that use Luneburg lenses, which are multi-layer lenses, typically spherical in shape, that have dielectric materials having different dielectric constants in each layer. Unfortunately, the costs of Luneburg lenses is prohibitively high for many applications, and antenna systems that use Luneburg lenses may still have problems in terms of beam width stability over a wide frequency band.

U.S. Patent Publication No. 2015/0091767 ("the '767 publication") proposes a multi-beam antenna that has linear arrays of radiating elements and a cylindrical RF lens that is formed of a composite dielectric material. The RF lens is used to focus the antenna beams of the linear arrays in the azimuth plane. In an example embodiment, the 3 dB azimuth beam width of a linear array may be reduced from 65° without the lens to 23° with the lens. The entire contents of the '767 publication are incorporated herein by reference. The cylindrical RF lens of the '767 publication, however, may be quite large, increasing the size, weight and cost of an antenna system using such a lens. In addition, cylindrical lenses may exhibit reduced cross-polarization performance which may be undesirable in applications where the antennas transmit and receive signals having two orthogonal polarizations such as slant +45°/−45° polarizations.

The lens disclosed in the '767 publication differs from a conventional Luneburg lens in that the dielectric constant of the material used to form the lens may be the same throughout the lens, in contrast with the Luneburg lens design in which multiple layers of dielectric material are provided where each layer has a different dielectric constant. A cylindrical lens having such a homogenous dielectric constant may be easier and less expensive to manufacture, and may also be more compact, having 20-30% less diameter. The lenses of the '767 publication may be made of small blocks of a composite dielectric material. The dielectric material focuses the RF energy that radiates from, and is received by, the linear arrays. The '767 publication teaches that the dielectric material may be a composite dielectric material of the type described in U.S. Pat. No. 8,518,537 ("the '537 patent"), the entire contents of which is incorporated herein by reference. In one example embodiment, small blocks of the composite dielectric material are provided, each of which includes at least one needle-like conductive fiber embedded therein. The small blocks may be formed into a much larger structure using an adhesive that glues the blocks together. The blocks may have a random orientation within the larger structure. The composite dielectric material used to form the blocks may be a lightweight material having a density in the range of, for example, 0.005 to 0.1 g/cm$^3$. By varying the number and/or orientation of the conductive fiber(s) that are included inside the small blocks, the dielectric constant of the material can be varied from 1 to 3.

Unfortunately, the composite dielectric material used in the lens of the '767 publication may be expensive to manufacture. Moreover, because the composite dielectric material includes conductive fibers, it may be a source of passive intermodulation ("PIM") distortion that can degrade the quality of the communications if metal-to-metal contacts are formed between different conductive fibers. Additionally, the conductive fibers included in adjacent small blocks of material may become electrically connected to each other resulting in larger particle sizes that can negatively impact the performance of the lens.

Pursuant to embodiments of the present invention, antennas suitable for use as base station antennas are provided that include lenses formed of various lightweight, low-loss composite dielectric materials. The imaginary part of the complex representation of the permittivity of a dielectric material is related to the rate at which energy is absorbed by the material. The absorbed energy reflects the "loss" of the dielectric material, since absorbed energy is not radiated. Low-loss dielectric materials are desirable for use in lenses for antennas as it is desirable to reduce or minimize the amount of RF energy that is lost in transmitting the signal through the lens.

A number of low loss dielectric materials are known in the art such as, for example, solid blocks of polystyrene, expanded polystyrene, polyethylene, polypropylene, expanded polypropylene and the like. Unfortunately, these materials may be relatively heavy in weight and/or may not have an appropriate dielectric constant. For some applications, such as lenses for base station antennas, it may be important that the dielectric material be a very low weight material.

A number of competing concerns may be weighed when designing an RF lens for a lensed base station antenna. Tower loading is a concern since a heavier antenna requires more robust support structures (which increases cost) and may be more difficult to install. Accordingly, all else being equal, lighter RF lens material is generally preferred. Additionally, RF losses are preferably kept to a minimum, which means the lens material should be relatively low loss throughout the frequency range at which the antenna is designed to operate. The lens material also preferably is relatively PIM-free as any PIM generated in the RF lens may significantly deteriorate the performance of the entire RF system. The RF lens material is also preferably relatively low cost, and should have a dielectric constant that is useful for focusing RF energy in the operating frequency range of the antenna. The dielectric constant of the RF lens also preferably maintains suitable uniformity throughout the RF lens to provide consistent focusing of the RF energy.

Pursuant to embodiments of the present invention, RF lens have been developed in which a dielectric base material is used in combination with a dielectric constant increasing material to provide relatively lightweight and low cost RF lens that have low RF losses and exhibit good PIM performance.

The RF lenses according to embodiments of the present invention can use one of a number of low density dielectric base materials to form a matrix for distributing dielectric constant increasing material throughout the RF lens including, for example, reticular foam blocks, foamed spheres, foamed microspheres, cured foam polymers and the like.

The RF lenses according to embodiments of the present invention can employ a number of different materials that may be used to provide a suitable dielectric constant for the lens (i.e., dielectric constant increasing materials). These materials may include particles of high dielectric constant materials such as ceramics and non-conductive oxides, carbon black, and conductive materials such as metal particles (e.g., metal powders, chopped metal fibers, etc.) or metal containing sheet material such as metal foils, flitter or glitter flakes and the like. Binder materials such as oils or adhesives may be used in some embodiments to adhere the materials that provide the increased dielectric constant to the low density dielectric base materials. The composite dielectric materials according to embodiments of the present invention may achieve an overall dielectric constant for the RF lens that is suitable for focusing RF energy in the operating frequency range of the antenna.

In some embodiments of the present invention, antennas are provided that have lenses that are formed of foam blocks that have conductive materials and/or high dielectric constant dielectric materials adhered to the exterior of the foam blocks using, for example, binders such as glue or epoxy. When conductive materials are used, the conductive materials may be covered with an insulating material to reduce or eliminate metal-to-metal contacts that could lead to PIM distortion. The foam blocks may be very lightweight and may serve as a matrix for supporting the conductive or high dielectric constant dielectric materials and for distributing the conductive or high dielectric constant dielectric materials throughout a volume. The foam blocks may have a relatively low dielectric constant. In embodiments that include conductive materials, the conductive materials may comprise, for example, glitter, flitter, thin wires or other materials that include a very thin (e.g., 10-2000 nm) conductive foil that has an insulating material coated thereon. Embodiments that use high dielectric constant materials may use ceramics, non-conductive oxides, carbon black and the like. The blocks of the composite dielectric material may be held together using a binder such as polyurethane, epoxy, oil, etc. that has low dielectric losses or, alternatively, may be simply be filled into a container having the desired shape for the RF lens to form the RF lens.

In other embodiments, antennas are provided that have lenses that are formed of a reticular foamed material that has conductive particles and/or particles of a high dielectric constant material embedded throughout the interior of the reticular foamed material and/or on the external surfaces of the reticular foamed material using a binder. In such embodiments, a plurality of small blocks of this composite dielectric material may be formed and placed in a container to form the RF lens or the RF lens may comprise a single block of this material that may be shaped into the desired shape for the lens (e.g., a spherical shape, a cylindrical shape, etc.). The reticular foamed material may have a very open cell structure to reduce the weight thereof, and the conductive and/or high dielectric constant particles may be bound within the matrix formed by the foam by the binder material. Suitable particles include particles of lightweight conductors, ceramic materials, conductive oxides and/or carbon black. In embodiments that use small blocks of this composite dielectric material, the blocks may be held together using a low dielectric loss binder or adhesive or may be simply be filled into a container to form the lens.

In still other embodiments, antennas are provided that have RF lenses that are formed using sheets of foam that have conductive sheets (e.g., aluminium foil) therebetween. This composite foam/foil material may then be cut into small blocks that are used to form an RF lens for an antenna. The foam sheets may comprise a highly foamed, very lightweight, low dielectric constant material. One or more sheets of such foam may be used, along with one or more sheets of metal foil. If metal foil is provided on an external layer, it may be coated with an insulating material to reduce or prevent metal-to-metal contacts. In some embodiments, the foam sheets may be formed of an expandable material such as, for example, a material that expands when heated. After the composite dielectric material is cut into blocks, the composite dielectric material may be heated so that the foam sheets expand, thereby encapsulating the metal foil within the interior of the composite dielectric material. In this manner, metal-to-metal contacts between the metal foils in adjacent blocks may be reduced or prevented. The blocks of material formed in this manner may be held together using a low dielectric loss binder or adhesive or may simply be filled into a container to form the lens.

In yet further embodiments, antennas are provided that have lenses that are formed using expandable microspheres (or other shaped expandable materials) that are mixed with a binder/adhesive along with conductive materials that are encapsulated in insulating materials. In some embodiments, the conductive materials may comprise glitter or flitter that is cut into very small particles. The expandable microspheres may comprise very small (e.g., 1 micron in diameter) spheres that expand in response to a catalyst (e.g., heat) to much larger (e.g., 40 micron diameter) air-filled spheres. These spheres may have very small wall thickness and hence may be very lightweight. The expanded microspheres along with the binder may form a matrix that holds the conductive materials in place to form the composite dielectric material. In some embodiments, the expanded spheres may be significantly smaller than the conductive materials (e.g., small squares of glitter or flitter). In other embodiments, the conductive materials may be replaced with high dielectric constant materials such as ceramic particles, non-conductive oxide particles or carbon black.

In still other embodiments, lensed antennas are provided that include a plurality of radiating elements and a lens positioned to receive electromagnetic radiation from at least one of the radiating elements. The RF lens may comprise a semi-solid, flowable composite dielectric material that is poured or pumped into a lens shell. The composite dielectric material may comprise expandable gas-filled microspheres that are mixed with an inert binder, dielectric support materials such as foamed microspheres and particles of conductive material. The conductive material may comprise, for example, glitter flakes, flitter flakes or insulated metal fibers. The dielectric support materials may be significantly larger than the conductive materials and may help randomize the orientation of the conductive materials. The expandable microspheres and the binder (e.g., an oil) may hold the material together and may also help separate the conductive materials to reduce the likelihood of metal-to-metal contacts within the composite dielectric material. In other embodiments, the conductive materials may be replaced with high dielectric constant materials such as ceramic particles, non-conductive oxide particles or carbon black.

According to still further embodiments, antennas are provided that have RF lenses that are formed using one or more thin wires that are coated with an insulating material and loosely crushed into a block-like shape. As the wires are rigid, they may be used to form a composite dielectric material without the need for a separate material (other than air) such as a foam that form a matrix for holding the conductive material in place. In some embodiments, the crushed wire(s) may be formed into the shape of a lens. In other embodiments, a plurality of blocks of crushed wire(s) may be combined to form the lens.

In yet additional embodiments, antennas are provided that have lenses that are formed using thin sheets of dielectric material or metal foil that is either crumpled or shredded and placed in a container having the desired shape for the lens. As with the insulated wire embodiment discussed above, the crumbled/shredded sheets of dielectric material or metal foil may exhibit rigidity and hence may be held in place without an additional matrix material.

Embodiments of the present invention will now be discussed in further detail with reference to the drawings, in which example embodiments are shown.

Figure 1B:
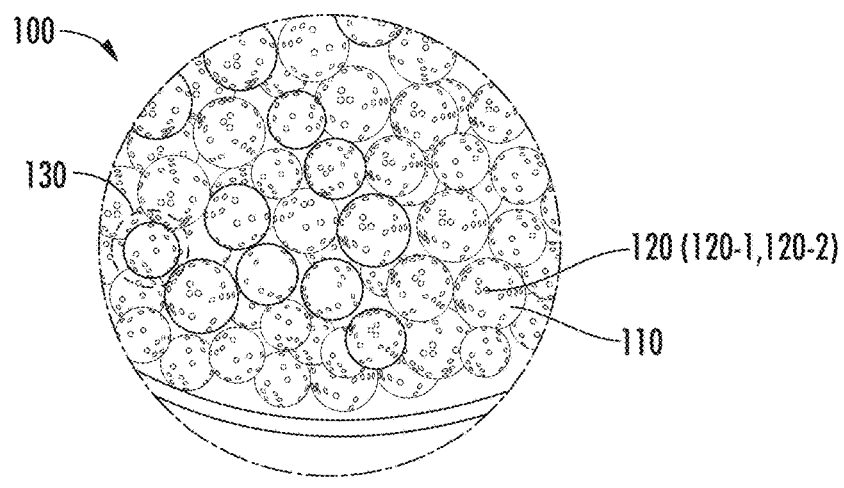
FIG. 1B is an enlarged view of a portion of FIG. 1A that illustrates the structure of the composite dielectric material in greater detail.

FIG. 1A is a schematic perspective view of an RF lens 150 according to embodiments of the present invention that is formed using a composite dielectric material 100. The RF lens 150 may be suitable for use as a lens of a base station antenna. FIG. 1B is an enlarged view of a portion of FIG. 1A that illustrates the structure of the composite dielectric material 100 in greater detail.

As shown in FIGS. 1A-1B, the composite dielectric material 100 comprises blocks (here spherical blocks) 110 of a lightweight base dielectric material that has particles 120 of a second material adhered to the exterior thereof that together form blocks 130 of the composite dielectric material 100. The lightweight base dielectric material may comprise, for example, a foamed plastic material such as polyethylene, polystyrene, polytetrafluoroethylene (PTFE), polypropylene, polyurethane silicone or the like. This foamed plastic material may have a very low density and may have a relatively low dielectric constant. In some embodiments, each block 110 of the foamed lightweight base dielectric material may be more than 50% air by volume (i.e., a foaming percentage that exceeds 50%). In some embodiments, the foaming percentage of the base dielectric material may exceed 70% or may even exceed 80%. Such high foaming percentages may facilitate reducing the weight of the composite dielectric material 100 and hence the weight of the lens 150 formed thereof.

In the depicted embodiment, the particles 120 of the second material may comprise, for example, small particles 120-1 that include a conductive material. In some embodiments, the conductive material may be covered on at least one side with an insulating material to reduce or eliminate metal-to-metal contacts that could lead to PIM distortion. In one example embodiment, the small particles 120-1 that include the conductive material may comprise finely cut thin squares or "flakes" of glitter. Glitter, which is readily available commercially, typically comprises a sheet of plastic substrate that has a very thin sheet of metal deposited thereon. An insulative coating (e.g., a polyurethane coating) may then be coated onto the exposed surface of the thin sheet of metal to encapsulate the metal on both sides. In an example embodiment, the plastic substrate may have a thickness of between 0.5 and 50 microns, and the thin coating of insulative material may have a thickness of between 0.5 and 15 microns. The thin sheet of metal may comprise, for example, a sheet of aluminium having a thickness between 1 and 50 nanometers. In typical commercially available glitter, the overall thickness of the material may be about 20-30 microns and the aluminium sheet may have a thickness of between 10-100 nanometers. The plastic substrate may comprise any suitable plastic substrate such as polyvinylchloride (PVC), polyethylene terephthalate (PET) or the like. The metal may comprise less than 1% of the glitter by volume.

In other embodiments, the small particles 120-1 that include a conductive material may comprise finely cut flitter flakes. Flitter, which is also readily available commercially, typically comprises a thicker sheet of metal with an insulative coating (e.g., a polyurethane coating) on one or both major surfaces thereof. In an example embodiment, the metal sheet may comprise an aluminium sheet having a thickness of between 6 and 50 microns, and the thin coating(s) of insulative material may have thicknesses of between 0.5 and 15 microns.

In each of the above embodiments, sheets of glitter or flitter may be cut into the small particles. In an example embodiment the glitter/flitter particles 120-1 may be relatively square in shape with lengths and/or widths on the order of 50 to 1500 microns. In such embodiments, the particles 120-1 may be sheet-like in nature as they may have a thickness (e.g., 25 microns) that is substantially smaller than their length and width. It will be appreciated, however, that other shapes (e.g., hexagons), lengths and widths may be used in other embodiments. Materials other than glitter and flitter may also be used. For example, in still other embodiments, the particles 120-1 may comprise small metal particles such as aluminium or copper powder or small metal fibers 120-1. These small metal particles/fibers 120-1 may or may not have an insulative coating.

In other embodiments (not shown), the particles 120 of a second material may comprise, for example, small particles 120-2 of a high dielectric constant material. The high dielectric constant material may preferably have a relatively high ratio of dielectric constant to weight, and also is preferably relatively inexpensive. The high dielectric constant material may comprise thin disks (or other shaped particles) of a ceramic material (e.g., $Mg_2TiO_4$, $MgTiO_3$, $CaTiO_3$, $BaTi_4O_9$, boron nitride, etc.) or of a non-conductive oxide (e.g., titanium oxide, aluminium oxide, etc.) in some embodiments. In still other embodiments, the small particles 120-2 of high dielectric constant material may comprise carbon black particles.

As shown in FIG. 1B, the particles 120 may be adhered to the exterior surfaces of the blocks 110 of lightweight base dielectric material to form a plurality of blocks 130 of the composite dielectric material 100. An adhesive such as a glue may be used to adhere the small particles 120 to the blocks 110 of the lightweight base dielectric material. The blocks 110 of the lightweight base dielectric material may thus serve as a matrix for supporting the particles 120 of the second material and for relatively evenly distributing the particles 120 of the second material throughout the RF lens 150.

The blocks 130 of the composite dielectric material 100 may be held together using a separate binder (not shown) such as polyurethane, epoxy, etc. that has low dielectric losses or, alternatively, may simply be filled into a container 140 to form the lens 150. While spherical blocks 130 are illustrated in FIGS. 1A-1B, it will be appreciated that other shapes or a variety of different shaped blocks may be used.

The density of the composite dielectric material 100 can be, for example, between 0.005 to 0.2 g/cm³ in some embodiments. The number of particles 120 that are included in the composite dielectric material 100 may be selected so that the composite dielectric material 100 has a dielectric constant within a desired range. In some embodiments, the dielectric constant of the composite dielectric material 100 may be in the range of, for example, 1 to 3.

As noted above, in some embodiments, the blocks 130 of the composite dielectric material 100 may be contained within a container 140 such as a shell formed of a dielectric material that is shaped in the desired shape for the RF lens for a base station antenna. Base station antennas may be subject to vibration or other movement as a result of wind, rain, earthquakes and other environmental factors. Such movement can cause settling of the blocks 130, particularly if an adhesive is not used and/or if some blocks 130 are not sufficiently adhered to other blocks 130 and/or if the adhesive loses adhesion strength over time and/or due to temperature cycling. In some embodiments, the container 140 may include a plurality of individual compartments (not shown) and the small blocks 130 may be filled into these individual compartments to reduce the effects of settling of the blocks 130. The use of such compartments may increase the long term physical stability and performance of the RF lens 150. It will also be appreciated that the blocks 130 may also and/or alternatively be stabilized with slight compression and/or a backfill material. Different techniques may be applied to different compartments, or all compartments may be stabilized using the same technique.

Figure 2A:
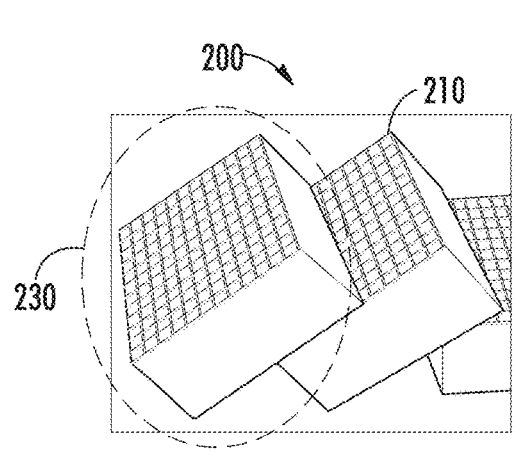
FIG. 2A is a schematic perspective view of a composite dielectric material according to further embodiments of the present invention that is suitable for use in fabricating a lens for an antenna.
Figure 2B:
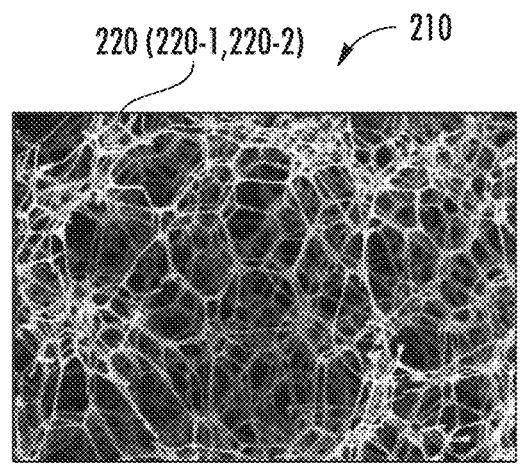
FIG. 2B is a schematic perspective view illustrating the cell structure of the foam that is included in the composite dielectric material of FIG. 2A.

FIG. 2A is a schematic perspective view of a composite dielectric material 200 according to embodiments of the present invention that is suitable for use in fabricating a lens for a base station antenna. As shown in FIG. 2, the composite dielectric material 200 comprises one or more blocks 210 of a lightweight base dielectric material that have particles 220 of a second material embedded throughout. FIG. 2B is a schematic perspective view illustrating the cell structure of a small portion of one of the blocks 210 of the lightweight base dielectric material.

The base dielectric material may comprise a highly foamed material having a very low density that has a reticular (i.e., net like) cell structure. This is depicted graphically in FIG. 2B, which shows that the base dielectric material may comprise elongated strands of material that form a matrix.

In some embodiments, the particles 220 of the second material may comprise particles 220-1 of a high dielectric constant material such as, for example, a ceramic material (e.g., $Mg_2TiO_4$, $MgTiO_3$, $CaTiO_3$, $BaTi_4O_9$, $BaTiO_3$, boron nitride, etc.), carbon black or a non-conductive oxide (e.g., titanium oxide, aluminium oxide, etc.). In other embodiments, the particles 220 of the second material may comprise particles 220-2 of a conductive material. In either case, the blocks 210 of the base dielectric material are embedded with the particles 220 of the second material or the blocks 210 of the base dielectric material are coated with a slurry that includes the particles 220 of the second material. The second material may preferably be relatively inexpensive. The particles 220 of the second material may be adhered throughout the matrix of base dielectric material using a binder (not shown) such as, for example, polyurethane or polyvinyl butyral to form blocks 230 of the composite dielectric material 200. The base dielectric material may be provided in liquid form and mixed with the particles 220 of the second material and the binder and the resulting mixture may then be foamed to form the composite dielectric material 200. In some embodiments, specifically including embodiments where a slurry of the second material 220 is coated on the base dielectric material, the base dielectric material may be provided in the form of small blocks 210 (e.g., cubes, spheres or other shaped structures) as described above. In example embodiments, the blocks 210 may be 5 mm or less per side. The blocks 230 of the composite dielectric material 200 may then be adhered together using another binder to form the RF lens or may be used to fill a shell such as the above-described container 140 that has the desired shape for the RF lens. In other embodiments, the composite dielectric material 200 may be foamed into the desired shape for the RF lens.

In embodiments in which the particles 220 are particles 220-2 of a conductive material, the conductive material may comprise a conductive powder such as an aluminium, copper or carbon black powder. In other embodiments, the particles 220-2 of the conductive material may comprise chopped insulated metal fibers. For example, insulated magnet wire is a metal fiber that is commercially available and that comes in very fine gauges such as, for example AWG gauges of 20 or more. A 20 AWG magnet wire has a nominal bare wire diameter of about 0.032 inches while a 50 AWG magnet wire has a nominal bare wire diameter of about 0.0099 inches. The bare magnet wire is coated with a thin film of insulating material (e.g., an insulating resin) that may increase the overall diameter of the magnet wire by less than, for example, 10%. Aluminum wire may be used to reduce the weight. The insulated magnet wire may be chopped into fine pieces (e.g., lengths of between 0.1 mm and 10 mm) to provide the particles 220-2 of chopped metal fibers. The particles 220-2 of chopped metal fibers may be distributed throughout each block 210 of the base dielectric material. The particles 220-2 of chopped metal fibers may be embedded within the blocks 210 of the base dielectric material in some embodiments. A binder such as, for example, polyurethane or polyvinyl butyral or oil (not shown) may be used to adhere the particles 220-2 of chopped metal fibers to the lightweight base dielectric material.

In still other embodiments, metal sheet material that has insulating layers on either side thereof may be chopped into small pieces and used in place of the chopped insulated magnet wire as the particles 220-2 of conductive material. The metal sheet material may comprise, for example, a metal foil having a thin insulating film of polyethylene terephthalate on each major surface thereof. When such sheet material is chopped into small pieces it is commonly referred to as glitter or flitter depending upon the thicknesses of the metal foil and the insulating layers deposited thereon. It will be appreciated that flitter and/or glitter may be used in place of the chopped insulated magnet wire in each of the above-described embodiments.

The composite dielectric material 200 may be formed by, for example, manufacturing pellets that include the base dielectric material and the particles 220 of the second material. As discussed above, the second material may be any of a variety of dielectric constant increasing materials such as, for example, metal particles (e.g., flitter or glitter flakes, metal powder, metal foil, chopped insulated magnet wires, etc.), carbon black particles, non-conductive oxide particles (e.g., titanium oxide, aluminium oxide, etc.) or particles of high dielectric constant ceramic materials (e.g., $Mg_2TiO_4$, $MgTiO_3$, $CaTiO_3$, $BaTi_4O_9$, $BaTiO_3$, boron nitride, etc.). These pellets may be formed, for example, by heating the base dielectric material to melt the base dielectric material, adding the particles 220 of the second material to the molten base dielectric material, shear mixing the composite and then allowing the mixture to cool and cutting the resulting material into pellets. The pellets may then be fed into an extruder that shears the pellets and melts the material. A solid, liquid or gaseous foaming agent may then be injected into the melt under high pressure. The extruded material may be cooled quickly which acts to trap the foaming agent within the cooled material in liquid (or highly compressed) form. Thereafter, a controlled heating process may be performed that softens the base dielectric material allowing the foaming agent to expand and foam the material to form the foamed composite dielectric material 200.

In some embodiments, the lightweight base dielectric material containing the particles 200 of the second material may be foamed into the desired shape for the RF lens to provide a monolithic RF lens structure as opposed to a lens formed of smaller discrete blocks 210 of the lightweight base dielectric material with the particles 220 of the second material embedded therein. In still other embodiments, the lightweight base dielectric material may be foamed to form the blocks 210 of lightweight base dielectric material and the particles 220 of the second material may be separately mixed with a binder to form a slurry. The slurry of particles 220 in a binder may then be coated onto the outer surface of the blocks 210 of base dielectric material. As described above, the particles 220 of the second material may comprise particles of a material that increases the dielectric constant of the composite material, such as particles 220-1 of a high dielectric constant material or particles 220-2 of a conductive material.

The density of the composite dielectric material 200 can be, for example, between 0.005 to 0.2 $g/cm^3$ in some embodiments. The number of particles 220 of the second material that are included in the composite dielectric material 200 may be selected so that the composite dielectric material 200 has a dielectric constant within a desired range. In some embodiments, the dielectric constant of the composite dielectric material 200 may be in the range of, for example, 1 to 3.

Figure 3A:
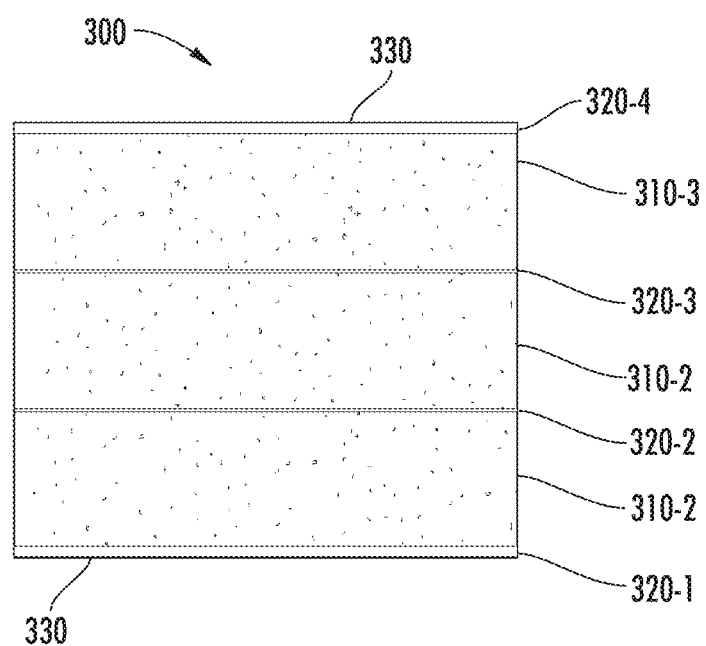
FIG. 3A is a schematic side view of a composite dielectric material according to still further embodiments of the present invention that is suitable for use in fabricating a lens for an antenna.
Figure 3B:
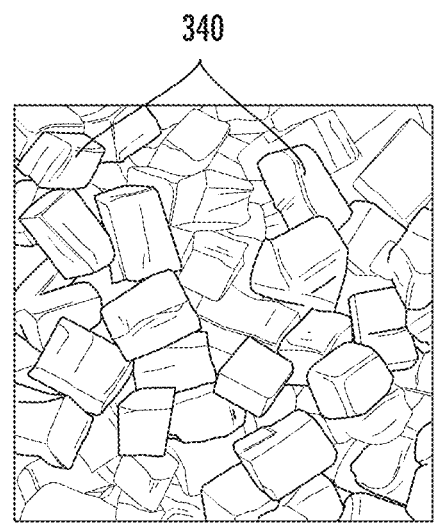
FIG. 3B is a schematic perspective view illustrating a plurality of blocks of the composite dielectric material of FIG. 3A.

FIG. 3A is a schematic side view of a composite dielectric material 300 according to still further embodiments of the present invention that is suitable for use in fabricating an RF lens for an antenna. FIG. 3B is a schematic perspective view illustrating a plurality of blocks 340 of the composite dielectric material 300 of FIG. 3A.

As shown in FIG. 3A, the composite dielectric material 300 may comprise one or more sheets 310 of a foamed material such as, for example, foamed polyethylene. In the depicted embodiment, three foam sheets 310-1, 310-2, 310-3 are provided, but more or fewer sheets 310 could be used in other embodiments. One or more sheets of thin metal 320 such as, for example, thin sheets of aluminium (e.g., aluminium foil), are sandwiched between adjacent one of the foam sheets 310. Additional thin metal sheets 320 may be provided on top of the uppermost foam sheet 310-3 and/or on the bottom surface of the lowermost foam sheet 310-1. In the depicted embodiment, a total of four metal sheets 320-1, 320-2, 320-3, 320-4 are provided. Top and bottom insulating cover sheets or coatings 330 may also be provided. The sheets/coatings 330 may comprise, for example, polyethylene terephthalate or polyurethane.

In some embodiments, the metal sheets 320 may be much thinner than the foam sheets 310. For example, each foam sheet 310 may be more than 1000 microns thick while the metal sheets 320 may be about 1-50 microns thick. The insulating sheets/coatings 330 may be, for example, about 30 microns thick. In some embodiments, a thickness of each metal sheet 320 may be less than 10% a thickness of each foam sheet 310.

The composite dielectric material 300 may be formed by alternatively stacking the foam sheets 310 and the metal sheets 320. A binder may be used in some embodiments to bind the metal sheets 320 to the foam sheets 310. If insulating sheets 330 are used, they may be adhered to the respective uppermost and lowermost metal sheets 320 using an adhesive. If insulative coatings 330 are used instead, they may be applied directly on the metal sheets 320 and may adhere thereto without any separate adhesive. Once the sheets/coatings 310, 320, 330 have been adhered together in the above manner or using some other approach, the resulting composite dielectric material 300 may be cut into smaller pieces. For example, in some embodiments, the sheets of the composite dielectric material 300 may be cut into rectangular, square or hexagonal blocks 340 that are, for example, between 1 millimeter and 6 millimeters in length, width and height. Other dimensions may be used, as may other shapes. The blocks 340 may then be used to form an RF lens in the same manner as discussed above with respect to the blocks 130. FIG. 3B illustrates a collection of the blocks 340.

In some embodiments, the foam sheets 310 may comprise a material that expands when heated. After the lightweight dielectric material 300 is cut into blocks 340, the blocks 340 may be heated to expand the foam layers 310 of each block 340. When this occurs the foam may expand outwardly so that the metal sheets 320 are encapsulated within the interior of the blocks 340. In this fashion, the possibility of metal-to-metal contact occurring between the metal sheet layers 320 in adjacent blocks 340 may be reduced or eliminated.

For example, in some embodiments, the foam sheets 310 may comprise sheets of expancel material. Expancel material refers to a material formed of expandable microstructures such as expandable microspheres. A series of expancel foam sheets 310 and metal sheet layers 320 may be alternatively stacked with, for example, about three metal sheet layers 320 separating about four expancel foam sheets 310. An adhesive/binder may be applied between some of all of the interfaces between an expancel foam sheet 310 and an adjacent metal sheet layer 320. The composite lightweight dielectric material 300 that is formed in this fashion may be expanded by application of heat and chopped into appropriate sized blocks 340. The chopping operation may be performed before or after the heating step that is used to expand the foam sheets 310. As noted above, if the heat treatment is applied after sheet material is chopped into blocks 340, then the foam layers may tend to cover exposed edges of the metal sheets 320, reducing the possibility of metal-to-metal contact occurring between the metal sheet layers 320 in adjacent blocks 340.

Figure 15:
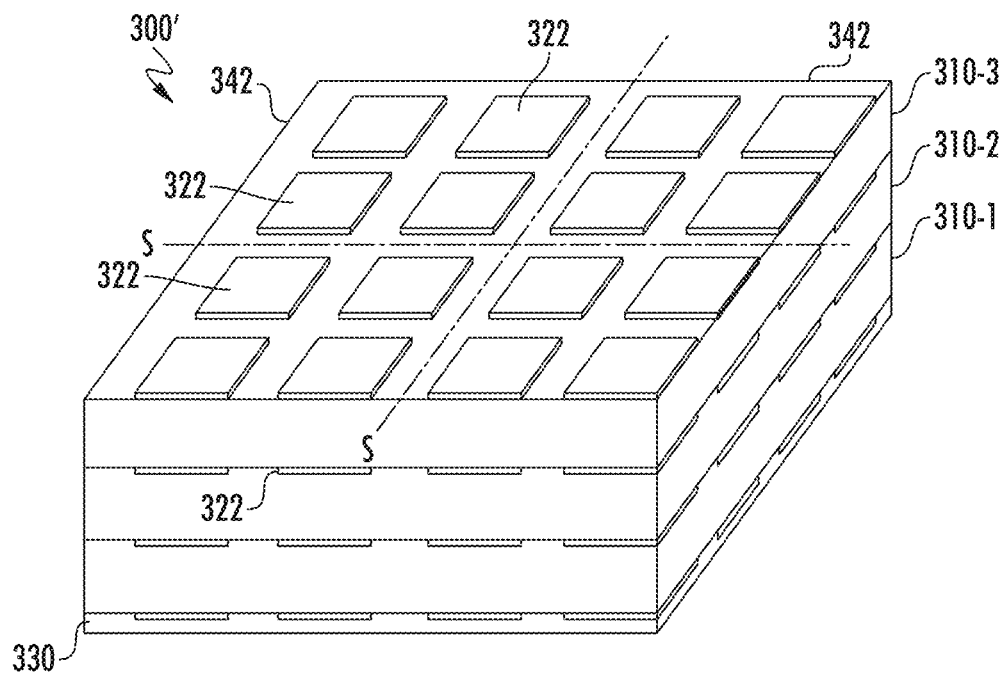
FIGS. 15-19 are schematic views of composite dielectric materials according to further embodiments of the present invention.

It will be appreciated that numerous modifications may be made to the above described embodiment. For example, each metal sheet 320 could be replaced with a plurality of thin strips of metal sheet material (e.g., thin strips of aluminium foil as opposed to a sheet of aluminium foil) that extend in parallel to each other and that are spaced apart from each other. In such an embodiment, it may be possible to eliminate the need for any adhesive/binder as adjacent foam layers 310 will be in direct contact with each other in the spaces between the adjacent strips of metal sheet material 320, and the foam sheets 310 can be designed so that they adhere to each other (e.g., by application of heat). In still other embodiments, the metal sheet material 320 may be replaced with glitter or flitter flakes 322 that are adhered to the foam sheets 310 using a binder/adhesive, or that are simply placed on the foam sheets 310 as is shown schematically in FIG. 15, which is a perspective view of a composite dielectric material 300' that is identical to the composite dielectric material 300 of FIG. 3A except that flitter flakes 322 are used in composite dielectric material 300' in place of the metal foils 320 used in composite dielectric material 300. In FIG. 15, the upper insulative coating 330 is omitted to more clearly show the flitter flakes 322. The composite dielectric material 300' may be cut into rectangular, square, hexagonal or other shaped blocks 340 in the manner described above and these blocks 340 may then be used to form an RF lens in the same manner as discussed above with respect to the blocks 130.

The use of glitter or flitter flakes 322 or small flakes of sheet metal 322 (i.e., glitter/flitter without the insulative coatings) may be particularly advantageous in embodiments where the foam sheets 310 are formed by expanding an expandable dielectric material. In such embodiments, the binder/adhesive may be applied to the center portion of each flake 322, and the flakes 322 may be placed on each layer of expandable dielectric material. The resulting material may then be cut into blocks 342 prior to expansion of the expandable dielectric material. The material may be cut into blocks 342 by cutting along scribe lines S that extend between rows and columns of the flakes 322. When the blocks 342 are subjected to heat, the expandable dielectric material may expand to form the foam sheets 310. The adhesive/binder may tend to hold each flake 322 in place as the expandable dielectric material 310 expands. Consequently, the flakes 322 may be more consistently encapsulated by the dielectric material 310, further reducing the possibility of metal-to-metal contact occurring between the metal sheet layers 320 in adjacent blocks 342 that could give rise to PIM distortion.

In further embodiments, the blocks 342 that are described above may be modified by replacing the flakes 322 with sheets of high dielectric constant ceramic materials such as $Mg_2TiO_4$, $MgTiO_3$, $CaTiO_3$, $BaTi_4O_9$, boron nitride, etc. The high dielectric constant ceramic sheet material may be continuous sheets of material, spaced-apart strips of sheet material or small flakes of the sheet material in the same manner, described above, that the metal foils 320 may be provided as sheet material, strips of sheet material or flakes of sheet material. In such embodiments, the foam layers 310 may be foam sheets or expancel layers that are later expanded to form the foam sheets 310 in the manner described above.

Figure 4:
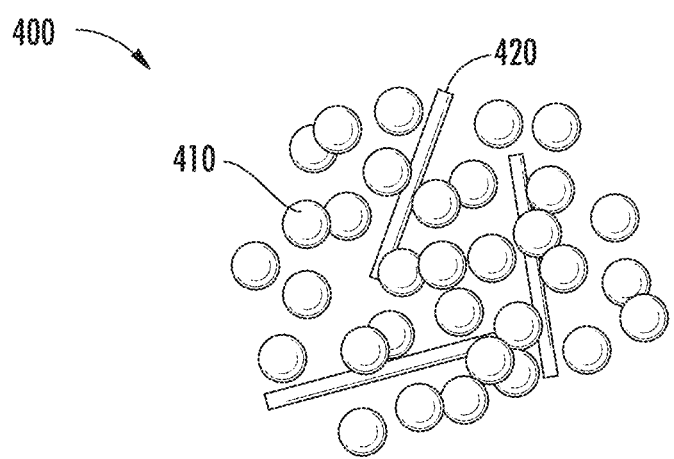
FIG. 4 is a schematic perspective view of a composite dielectric material according to yet additional embodiments of the present invention that is suitable for use in fabricating a lens for an antenna.

FIG. 4 is a schematic perspective view of a composite dielectric material 400 according to yet additional embodiments of the present invention that is suitable for use in fabricating an RF lens for an antenna. Referring to FIG. 4, the composite dielectric material 400 may comprise a plurality of microspheres 410 that are mixed with small metal disks 420 such as square, circular or rectangular-shaped glitter or flitter. In some embodiments, the microspheres 410 may comprise small spheres (e.g., 1 micron in diameter) that are formed of a dielectric material such as acrylonitrile butadiene styrene. These small spheres 410 may be expanded by, for example, application of heat. When expanded, the microspheres 410 are formed and may have a diameter of, for example, 15-75 microns and a very thin wall thickness of perhaps 0.25 microns. The interior of the microspheres 410 may largely comprise air or a blowing agent such as pentane or isobutane. These microspheres 410 may be very lightweight.

In some embodiments, the small metal disks 420 may be larger than the microspheres 410. For instance, in example embodiments the metal disks 420 may comprise particles of glitter or flitter that have lengths and widths of between 50 and 1500 microns and thicknesses of perhaps 25 microns (where the thickness of the metal sheet in the glitter/flitter is less than 25 microns). In some embodiments, the thickness of the metal sheet may be at least ten times smaller than the sum of the length and the width of the metal sheet. For example, in one embodiment the metal sheet in each flitter flake may be 200 microns×200 microns by 15 microns. Here, the 15 micron thickness is more than ten times smaller than sum of the width and the length (200 microns+200 microns=400 microns). The metal disks 420 may be mixed with a large number of the expanded microspheres 410, and a binder (not shown) such as, for example, an oil, may be added and the resulting blend of materials may be thoroughly mixed to distribute the metal disks 420 throughout the volume of material. A resulting mixture may be heated and turned into a solid block of the composite dielectric material 400. This block of the composite dielectric material 400 may be formed, cut or shaped into a desired shape for an RF lens, or may be cut into smaller blocks that are then used to form the RF lens in the same manner as discussed above with the previously described embodiments. In other embodiments, the dielectric material 400 may be a flowable mass of, for example, a semi-solid material that may fill a lens container.

In some embodiments, the microspheres 410 may be mixed with the metal disks 420 and binder while the microspheres 410 are in their unexpanded state. Tens or hundreds (or more) of microspheres 410 may be provided for each metal disk 420, and hence unexpanded microspheres 410 will tend to be between adjacent metal disks 420. After the microspheres 410, metal disks 420 and binder are thoroughly mixed, heat may be applied to expand the microspheres 410. As the microspheres 410 expand, they will tend to push adjacent metal disks 420 away from each other, thereby reducing or eliminating metal-to-metal connections between adjacent metal disks 420. Moreover, the metal disks 420 may comprise glitter or flitter (having, for example, the dimensions and characteristics described above) in some embodiments, which comprises encapsulated metal, thereby even further reducing the possibility of metal-to-metal contacts that may give rise to PIM distortion. In other embodiments, pure metal disks 420 may be used such as small squares of aluminium foil.

In some embodiments, the microspheres 410 may be smaller than the metal disks 420 in at least two dimensions. For example a length and width of the metal disks 420 may exceed the diameter of the microspheres 410. The opposed major surfaces of the metal disks may have any shape (e.g., square, circular, rectangular, hexagonal, arbitrary, etc.).

Figures 16, 17:
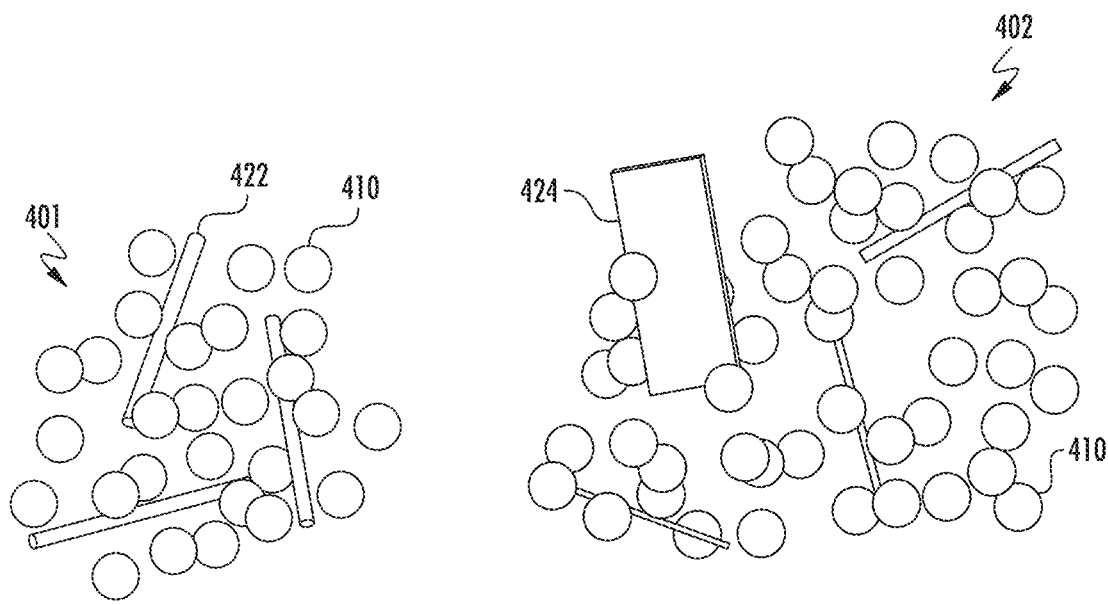

In further embodiments, chopped insulated magnet wire 422 of, for example, the type discussed above may be used in place of the metal disks 420 to provide a composite dielectric material 401, as is shown schematically in FIG. 16. In still other embodiments, the metal disks 420 may be replaced with particles 424 of other high dielectric constant materials such as, for example, metal (e.g., aluminium, copper) flakes, carbon black flakes, non-conductive oxide flakes (e.g., titanium oxide, aluminium oxide, etc.) or particles of high dielectric constant ceramic materials such as $Mg_2TiO_4$, $MgTiO_3$, $CaTiO_3$, $BaTi_4O_9$, $BaTiO_3$, boron nitride, etc. to provide a composite dielectric material 402, as is schematically shown in FIG. 17.

Figure 5:
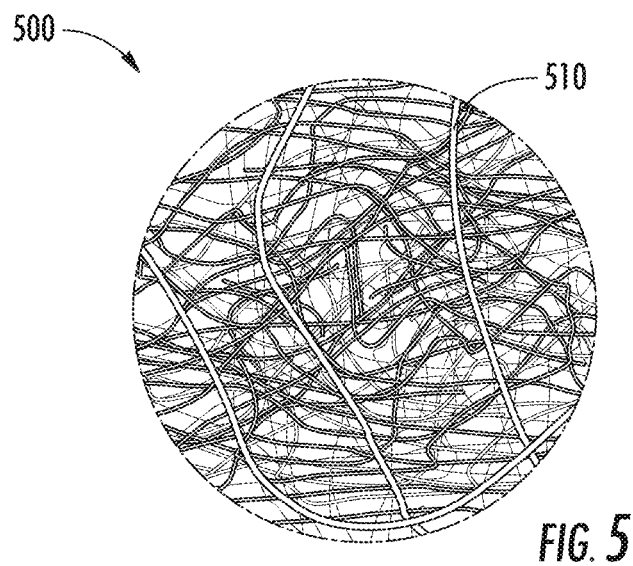
FIG. 5 is a schematic perspective view of a composite dielectric material according to still further embodiments of the present invention that is suitable for use in fabricating a lens for an antenna.

FIG. 5 is a schematic perspective view of a lightweight dielectric material 500 according to still further embodiments of the present invention that is suitable for use in fabricating an RF lens for an antenna. As shown in FIG. 5, the lightweight dielectric material 500 may comprise a thin wire 510 that includes a metal core (e.g., a copper core) that is covered by a thin insulative coating. The wire 510 may be bent so that it loosely fills a predetermined volume of space. Since the metal core may comprise a rigid material, the wire 510 may maintain its shape and be held in place without the use of matrix material such as, for example, the base dielectric material 110 of composite dielectric material 100. In some embodiments, a single wire 510 may be used to form an RF lens. In other embodiments, a plurality of wires 510 may be used to form a plurality of respective "blocks" 540 of the lightweight dielectric material 500, and these blocks 540 may then be adhered or fastened together or filled into a contained having the desired shape for the RF lens. In still other embodiments, each block 540 may include multiple wires 510.

Figure 6A:
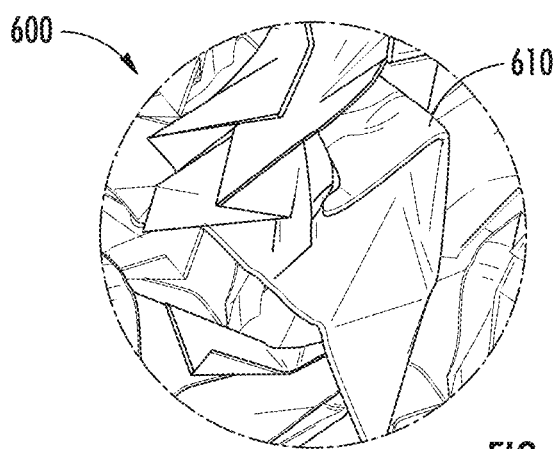
FIGS. 6A and 6B are schematic perspective views of composite dielectric materials according to additional embodiments of the present invention that are formed using, respectively, crumpled and shredded sheets of lightweight plastic dielectric material.
Figure 6B:
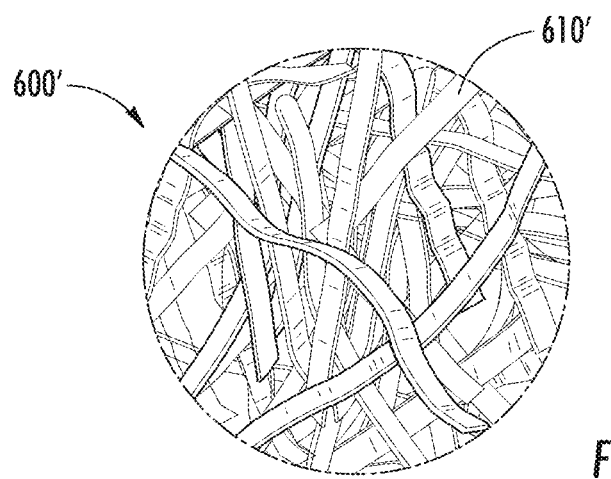

FIGS. 6A and 6B are schematic perspective views of lightweight dielectric materials 600 and 600', respectively, according to additional embodiments of the present invention that are formed using, respectively, crumpled and shredded sheets of lightweight plastic dielectric material.

Referring first to FIG. 6A, the lightweight dielectric material 600 may comprise a plurality of crumpled sheets of dielectric material 610. The sheet dielectric material 610 may comprise, for example, a plastic material or a plastic material combined with one or more additional materials. In some embodiments, the sheet dielectric material 610 may comprise, for example, Preperm® TP20555 Film and/or TP20556 Film, which are available commercially from Premix® (www.premixgroup.com). A variety of different plastic dielectric materials 610 are available in sheet form, including dielectric materials having dielectric constants ranging from, for example, 4 (Preperm® TP20555 Film) to 11 (Preperm® TP20556 Film). These materials may have thicknesses of, for example, 100 to 1000 microns. Similar materials exhibiting dielectric constants of less than four and/or greater than eleven could also be fabricated. Typically, the dielectric material will be selected from the available dielectric materials based on its weight (typically preferably low) and/or dielectric constant (typically preferably high) from the plastic dielectric materials that are available in sheet form. These plastic dielectric materials may have a thickness comparable to the thickness of thick paper (e.g., card stock paper) and may be readily crumpled like card stock paper. The crumpled sheets of dielectric material 610 may be used to fill a container to form an RF lens. The amount of crumpling may be selected to achieve a desired dielectric constant for the lens, as the dielectric constant for the lens will be based on the relative thicknesses, amounts and dielectric constants of the lens container, the crumpled dielectric material 610 and the air that fills the remainder of the space within the container.

Referring to FIG. 6B, in an alternative embodiment, the sheets of dielectric material 610 may be shredded into long strips using, for example, a paper shredder, and the strips of dielectric material 610' may then be crumpled and used to fill a container to form an RF lens. In still other embodiments, the above described sheet dielectric material may be rolled into a spiral with a very lightweight, low cost, low dielectric constant material (e.g., a material with a dielectric constant of between 1-1.5) which serves as a filler to provide a composite dielectric material having an effective dielectric constant and density within a desired range for the RF lens. It will likewise be appreciated that the sheet dielectric material may be formed into RF lenses in other ways as well. It will also be appreciated that metal sheet material such as metal foils may be used in place of the sheet dielectric material 610 in the embodiments of FIGS. 6A and 6B. The metal sheet material may be covered with insulating material on both sides to reduce and/or prevent metal-to-metal contacts between adjacent crumpled sheets. Herein, the term "crumpled" is used broadly to refer to sheet material that has been bent, smooshed, scrunched, crinkled or otherwise formed into a non-planar shape.

Figure 14:
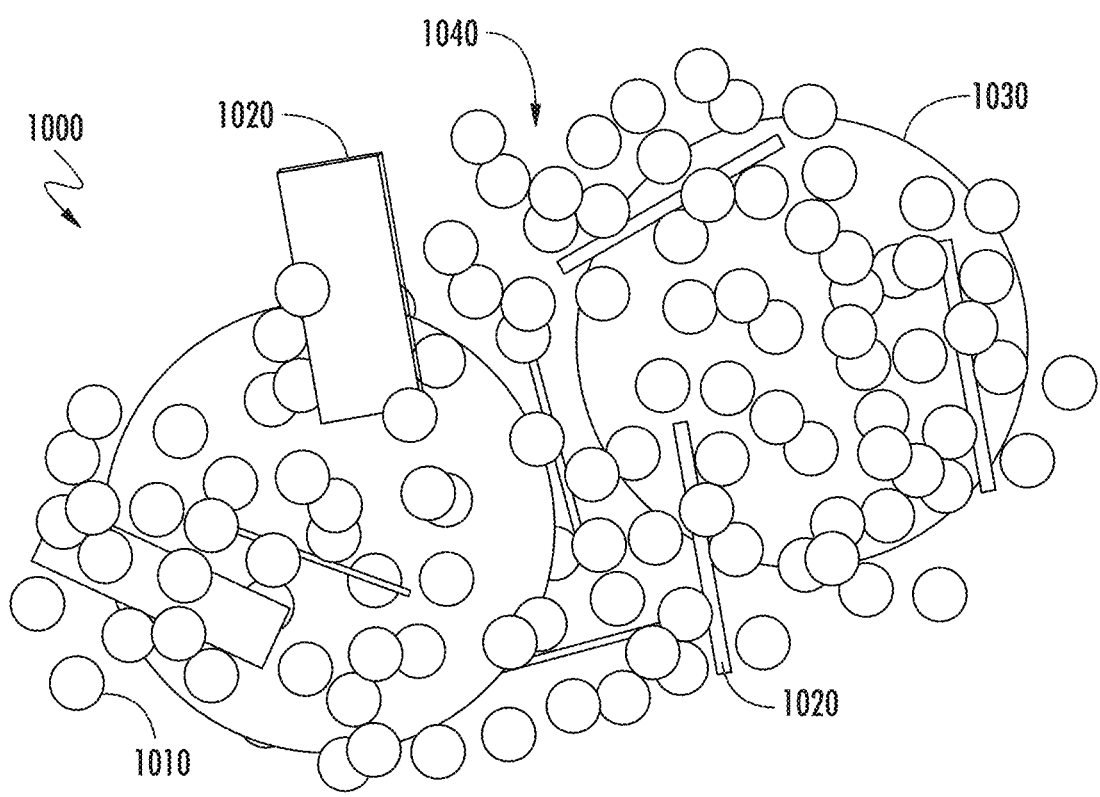
FIG. 14 is a schematic perspective view of another composite dielectric material that may be used to form the RF lenses according to embodiments of the present invention.

FIG. 14 is a schematic perspective view of a composite dielectric material 1000 according to further embodiments of the present invention. The composite dielectric material 1000 includes expandable microspheres 1010 (or other shaped expandable materials), conductive materials 1020 (e.g., conductive sheet material) that have an insulating material on each major surface, dielectric structuring materials 1030 such as foamed polystyrene microspheres or other shaped foamed particles, and a binder 1040 such as, for example, an inert oil.

The expandable microspheres 1010 may comprise very small (e.g., 1-10 microns in diameter) spheres that expand in response to a catalyst (e.g., heat) to larger (e.g., 12-100 micron in diameter) air-filled spheres. These expanded microspheres 1010 may have very small wall thickness and hence may be very lightweight. They may be identical to the expandable microspheres 410 discussed above with reference to FIG. 4. The small pieces of conductive sheet material 1020 having an insulating material on each major surface may comprise, for example, flitter. The flitter may comprise, for example, a thin sheet of metal (e.g., 1-25 microns thick) that has a thin insulative coating (e.g., 0.5-25 microns) on one or both sides thereof that is cut into small pieces (e.g., small 200-800 micron squares or other shapes having a similar major surface area). In example embodiments, the flitter 1020 may comprise a 1-10 micron thick metal layer (e.g., aluminium or copper), that is deposited on top of a sheet of base insulative material (e.g., a sheet of polyethylene terephthalate) having a thickness of 5-20 microns. A thinner insulative layer may be deposited on top of the metal layer, such as a 1-2 micron thick polyethylene or epoxy coating. Large sheets of the above-described flitter material may be formed, and these sheets may then be cut into small square or other shaped flakes. In one example embodiment, the flitter flakes may be 375×375 micron flakes that have a thickness of, for example, less than 25 microns. Other sized flitter flakes 1020 may be used (e.g., sides of the flake may be in the range from 100 microns to 1500 microns, and the flitter flakes 1020 need not be square).

The dielectric structuring materials 1030 may comprise, for example, equiaxed particles of foamed polystyrene or other lightweight dielectric materials such as expanded polypropylene. A wide variety of low-loss, lightweight polymeric materials may be used. An "equiaxed" particle refers to a particle that has axes that are roughly on the same order. Spheres, square cubes, hexagonal cubes and the like are all equiaxed particles, as are particles that are nearly those shapes (e.g., within 25%) or particles that are generally square cubes, spheres or the like that have non-smooth surfaces. The dielectric structuring materials 1030 may be larger than the expanded microspheres 1010 in some embodiments (e.g., having diameters of between 0.5 and 3 mm). The dielectric structuring materials 1030 may be used to control the distribution of the conductive sheet material 1020 so that the conductive sheet material has, for example, a suitably random orientation in some embodiments.

The microspheres 1010, conductive sheet material (e.g., flitter flakes) 1020, dielectric structuring materials 1030 and binder 1040 may be mixed together and heated to expand the microspheres 1010. The resulting mixture may comprise a lightweight, semi-solid, semi-liquid material in the form of a flowable paste that may have a consistency similar to, for example, warm butter. The material may be pumped or poured into a shell to form an RF lens for a base station antenna. The composite dielectric material 1000 in the RF lens focuses the RF energy that radiates from, and is received by, the linear arrays of any appropriate base station or other antenna including each of the antennas disclosed herein.

The use of flitter flakes 1020 having relatively thin metal layers (e.g., between 1-10 microns thick) may help improve the PIM distortion performance of the composite dielectric material 1000. While the flitter flakes 1020 have an insulating layer on each major surface thereof, since the flitter flakes 1020 may be formed by cutting sheet material, the edges of the metal may be exposed along the edges of the flitter flakes. This leads to the possibility of adjacent flitter flakes 1020 having metal-to-metal contact, which is a potential source of PIM distortion. When thicker metal layers are used, the possibility that two adjacent flitter flakes 1020 may experience such metal-to-metal contact is increased. In the composite dielectric material 1000, very thin metal sheets are used, which decreases the possibility of such metal-to-metal contact, and hence can result in improved PIM distortion performance. If the metal thickness is made too small, however, it may become more lossy, and hence there may be a trade-off between PIM distortion performance and RF energy loss. In some cases, flitter flakes 1020 having metal thickness in the range of 1-10 microns may exhibit excellent PIM distortion performance without being very lossy. Moreover, the thinner metal layers may also advantageously reduce the weight of the composite dielectric material 1000.

The equiaxed dielectric particles may all be the same size or may have different sizes. In some embodiments, an average volume of the equiaxed dielectric particles, which may be computed by adding the volumes of each individual equiaxed dielectric particle in a representative sample of the composite dielectric material and then dividing by the number of particles used in the averaging process, may be at least twenty times greater than an average volume of the particles of conductive material (which is computed in the same manner). In other embodiments, an average volume of the equiaxed dielectric particles may be at least ten times greater than an average volume of the particles of conductive material.

As noted above, performance of composite dielectric materials may be improved in some embodiments when the conductive material has a random orientation within the material. When flowable composite dielectric materials are used such as the composite dielectric material 1000, there may be a natural tendency for the flitter flakes 1020 to align somewhat along the direction of flow, such that the flitter flakes 1020 may not be that randomly oriented within the RF lens. The addition of the dielectric structuring materials 1030 may help randomize the orientation of the flitter flakes 1020. As noted above, the dielectric structuring materials 1030 may be a significantly larger than the flitter flakes 1020. The dielectric structuring materials 1030 may tend to organize in the composite material so that the flitter flakes 1020 fall into the natural openings between the dielectric structuring materials 1030. For example, when foamed spheres 1030 are used as the dielectric structuring materials 1030, the flitter flakes 1020 may tend to arrange themselves in the natural openings between stacked groups of foamed spheres 1030. This tends to orient the flitter flakes 1020 in particular directions in each grouping of foamed spheres 1030. Moreover, the groupings of foamed spheres 1030 may tend to have different orientations such that the groupings of foamed spheres 1030 may be randomly distributed throughout the composite dielectric material 1000. The net result is that this arrangement tends to randomize the orientation of the flitter flakes 1020.

As shown in FIG. 14, the expanded microspheres 1010 along with the binder 1040 may form a matrix that holds the flitter flakes 1020 and dielectric structuring materials 1030 in place to form the composite dielectric material 1000. The binder 1040 may generally fill the open areas between the expanded microspheres 1010, the flitter flakes 1020 and the dielectric structuring materials 1030 and hence is not shown separately in FIG. 14 for ease of illustration. The expanded microspheres 1010 may tend to separate adjacent flitter flakes 1020 so that sides of the flitter flakes 1020, which may have exposed metal, will be less likely to touch the sides of other flitter flakes 1020, since such metal-to-metal contacts may be a source of PIM distortion. If copper is used to form the flitter flakes 1020, the flitter flakes 1020 may be heated so that the exposed edges of the copper oxidizes into a non-conductive material which may reduce or prevent any flitter flakes 1020 that come into contact with each other from becoming electrically connected to each other, which may further improve PIM distortion performance in some embodiments.

In example embodiments, the dielectric structuring materials 1030 may comprise at least 40%, by volume of the composite dielectric material 1000. In some embodiments, the dielectric structuring materials 1030 may comprise more than 50% by volume. The combination of the inflatable microspheres 1010 and the binder may comprise between 20-40%, by volume of the composite dielectric material 1000 in some embodiments. In an example embodiment, the dielectric structuring materials 1030 may be equiaxed dielectric particles and may comprise at least 40%, by volume of the composite dielectric material 1000, and the the combination of the expandable gas-filled microspheres 1010 and the binder 1040 comprise between 20-40 percent by volume of the composite dielectric material 1000.

Using a semi-solid flowable composite dielectric material such as the material described above may have a number of advantages. The flowable dielectric material may be poured or pumped into a lens shell and may very evenly distribute throughout the lens shell.

Figure 18:
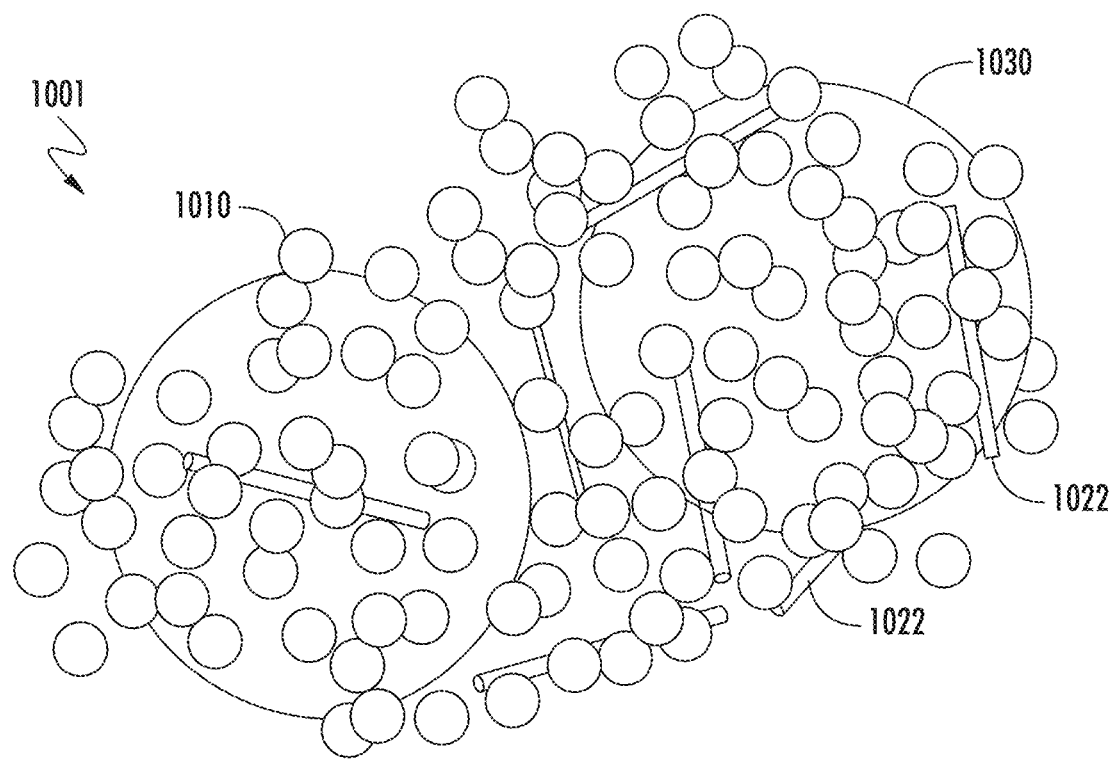

While flitter (or glitter) flakes 1020 are used as the conductive material in the embodiment of FIG. 14, it will be appreciated that other conductive materials may be used in place of the flitter flakes 1020 in other embodiments. For example, in further embodiments, chopped insulated magnet wire 1022 may be used in place of the flitter flakes 1020 to provide a composite dielectric material 1001, as is shown schematically in FIG. 18. In still other embodiments, the flitter flakes 1020 may be replaced with particles 1024 of high dielectric constant materials such as, for example, metal (e.g., aluminium, copper) particles, carbon black particles, non-conductive oxide particles (e.g., titanium oxide, aluminium oxide, etc.) or particles of high dielectric constant ceramic materials such as $Mg_2TiO_4$, $MgTiO_3$, $CaTiO_3$, $BaTi_4O_9$, $BaTiO_3$, boron nitride, etc.

Figure 19:
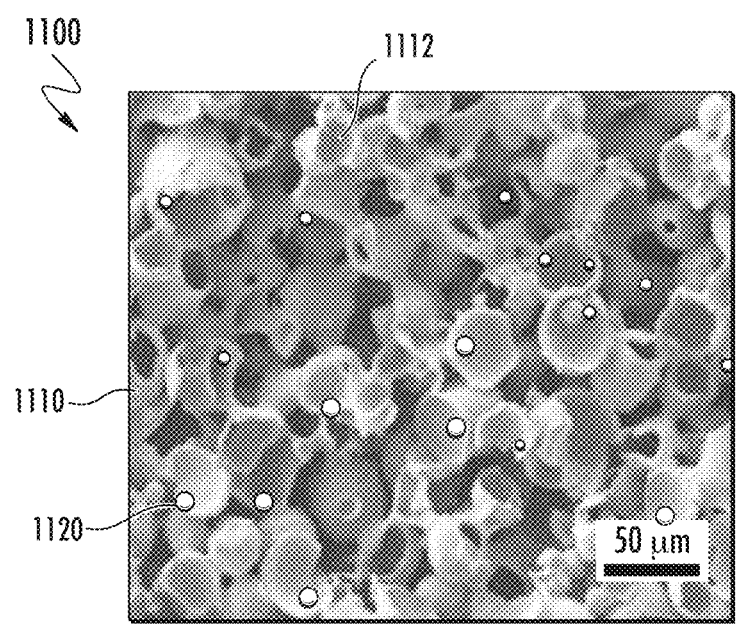

Referring to FIG. 19, according to further embodiments of the present invention, curable liquids such as curable liquid resins may be used to create composite dielectric materials 1100 that are suitable for use in RF lenses for antennas such as base station antennas. In these embodiments, a curable liquid polymer such as, for example, epoxy, silicone, acrylate, urethane or the like, may be mixed with any of a variety of dielectric constant increasing materials 1120 such as, for example, metal particles (e.g., flitter or glitter flakes, metal powder, metal foil, chopped insulated magnet wires, etc.), carbon black particles, non-conductive oxide particles (e.g., titanium oxide, aluminium oxide, etc.) or particles of high dielectric constant ceramic materials (e.g., $Mg_2TiO_4$, $MgTiO_3$, $CaTiO_3$, $BaTi_4O_9$, $BaTiO_3$, boron nitride, etc.) that have a higher dielectric constant than the inflatable microspheres 1010 and the dielectric structuring materials 1030. A low density foamable thermoplastic material and/or dielectric structuring materials 1030 may also be added to the mixture in some embodiments. A foaming agent may also be added to the mixture under pressure. The composite mixed material may then be foamed and thermoset by for example, heating, pressure, exposure to ultraviolet or visible light or any other appropriate thermosetting method for the selected curable liquid polymer. The resulting composite dielectric material 1100 may comprise a cured resin 1110 that has a closed cell foam structure that includes the dielectric constant increasing materials 1120 encapsulated within the cells 1112 of the cured polymer 1110. Accordingly, an additional binder typically may not be necessary.

The above-described composite dielectric materials may be used to form RF lenses for base station antennas. The above-described composite dielectric materials according to embodiments of the present invention may exhibit a number of advantages over conventional lens materials such as the composite dielectric material discussed in the above-referenced '537 patent. For example, the dielectric materials according to at least some embodiments of the present invention may be very lightweight, and may be relatively inexpensive to manufacture. Additionally, dielectric materials according to embodiments of the present invention may exhibit improved PIM distortion performance. As noted above, the conductive fibers included in the composite dielectric materials disclosed in the above-referenced '537 patent may comprise a source for PIM distortion, as the ends of the conductive fibers may be exposed and hence conductive fibers in adjacent particles may directly contact each other, providing inconsistent metal-to-metal contacts that are sources for PIM distortion. Additionally, the response of conductive materials to radiation emitted through the antenna may depend on the size and/or shape of the conductive fibers and the frequency of the emitted radiation. As such, clustering of particles, which can effectively create particles having, for example, longer effective lengths, can potentially negatively impact the performance of the antenna. The present inventors appreciated that the use of non-conductive high dielectric constant material or encased conductive materials may potentially provide improved performance as compared to the composite dielectric material of the '537 patent.

Figure 7A:
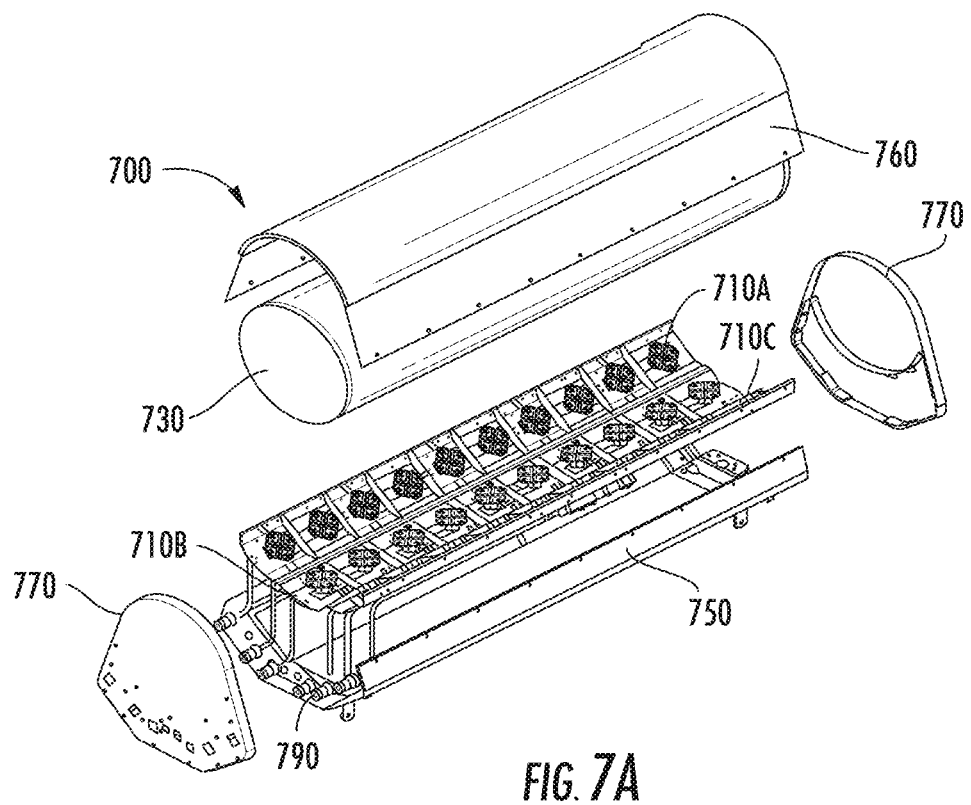
FIG. 7A is a perspective view of a lensed multi-beam antenna according to embodiments of the present invention.
Figure 7B:
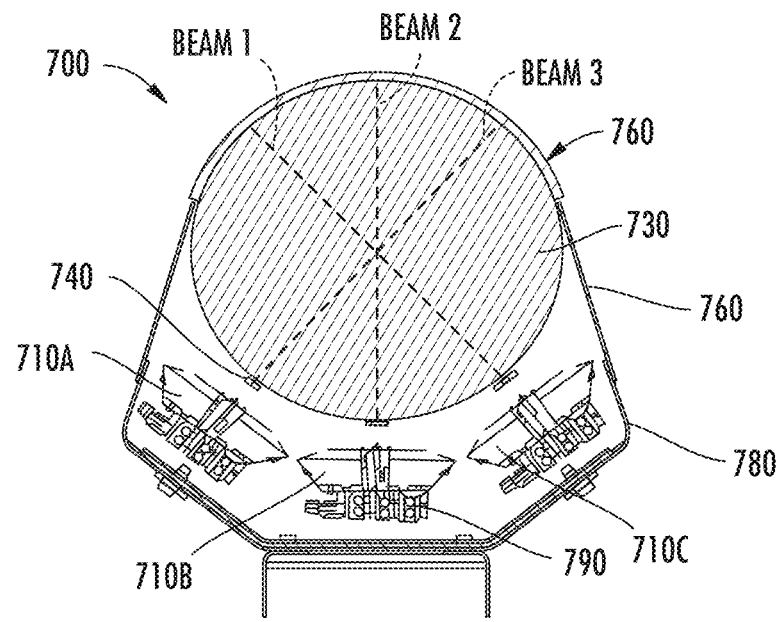
FIG. 7B is a cross-sectional view of the lensed multi-beam antenna of FIG. 3A.

FIG. 7A is a perspective view of a lensed base station antenna 700 according to embodiments of the present invention. FIG. 7B is a cross-sectional view of the lensed base station antenna 700. The lensed base station antenna 700 is a multi-beam antenna that generates three separate antenna beams through a single RF lens.

Referring to FIGS. 7A and 7B, the multi-beam base station antenna 700 includes one or more linear arrays of radiating elements 710A, 710B, and 710C (which are referred to herein collectively using reference numeral 710). The antenna 700 further includes an RF lens 730. In some embodiments, each linear array 710 may have approximately the same length as the lens 730. The multi-beam base station antenna 700 may also include one or more of a secondary lens 740 (see FIG. 7B), a reflector 750, a radome 760, end caps 770, a tray 780 (see FIG. 7B) and input/output ports 790. In the description that follows, the azimuth plane is perpendicular to the longitudinal axis of the RF lens 730, and the elevation plane is parallel to the longitudinal axis of the RF lens 730.

The RF lens 730 is used to focus the radiation coverage pattern or "beam" of the linear arrays 710 in the azimuth direction. For example, the RF lens 730 may shrink the 3 dB beam widths of the beams (labeled BEAM1, BEAM2 and BEAM 3 in FIG. 7B) output by each linear array 710 from about 65° to about 23° in the azimuth plane. While the antenna 700 includes three linear arrays 710, it will be appreciated that different numbers of linear arrays 710 may be used.

Figure 8:
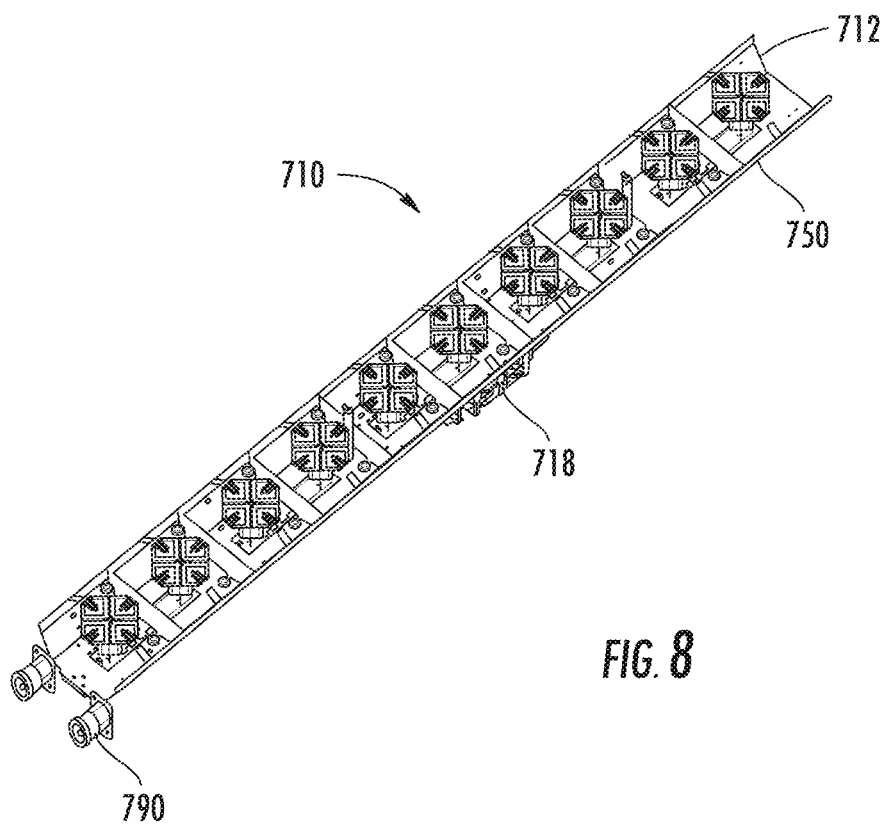
FIG. 8 is a perspective view of a linear array included in the lensed multi-beam antenna of FIG. 7A.
Figure 9A:
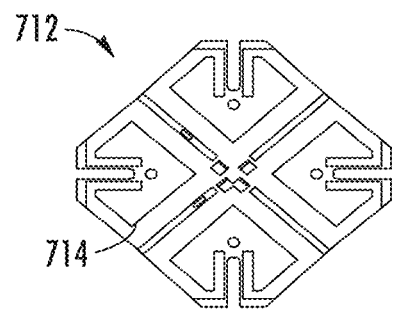
FIG. 9A is a plan view of one of the box-style dual polarized radiating elements included in the linear array of FIG. 8.
Figure 9B:
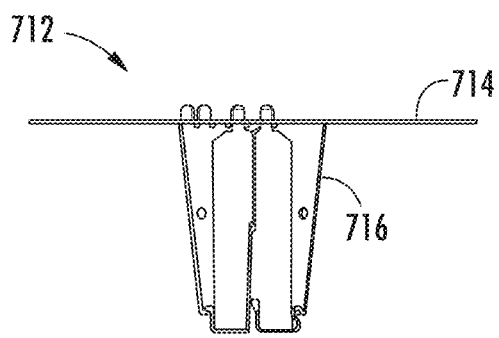
FIG. 9B is a side view of the box-style dual polarized radiating element of FIG. 9A.

Each linear array 710 includes a plurality of radiating elements 712 (see FIGS. 8, 9A and 9B). Each radiating element 712 may comprise, for example, a dipole, a patch or any other appropriate radiating element. Each radiating element 712 may be implemented as a pair of cross-polarized radiating elements, where one radiating element of the pair radiates RF energy with a +45° polarization and the other radiating element of the pair radiates RF energy with a −45° polarization.

The RF lens 730 narrows the half power beam width ("HPBW") of each of the linear arrays 710 while increasing the gain of the beam by, for example, about 4-5 dB for the 3-beam multi-beam antenna 700 depicted in FIGS. 7A and 7B. All three linear arrays 710 share the same RF lens 730, and thus each linear array 710 has its HPBW altered in the same manner. The longitudinal axes of the linear arrays 710 of radiating elements 712 can be parallel with the longitudinal axis of the lens 730. In other embodiments, the axis of the linear arrays 710 can be slightly tilted (2-10°) to the axis of the lens 730 (for example, for better return loss or port-to-port isolation tuning).

The multi-beam base station antenna 700 as described above may be used to increase system capacity. For example, a conventional 65° azimuth HPBW antenna could be replaced with the multi-beam base station antenna 700 as described above. This would increase the traffic handling capacity for the base station, as each beam would have 4-5 dB higher gain and hence could support higher data rates at the same quality of service. In another example, the multi-beam base station antenna 700 may be employed to reduce antenna count at a tower or other mounting location. The three beams (BEAM 1, BEAM 2, BEAM 3) generated by the antenna 700 are shown schematically in FIG. 7B. The azimuth angle for each beam may be approximately perpendicular to the reflector 750 for each of the linear arrays 710. In the depicted embodiment the −10 dB beamwidth for each of the three beams is approximately 40° and the center of each beam is pointed at azimuth angles of −40°, 0°, and 40°, respectively. Thus, the three beams together provide 120° coverage.

In some embodiments, the RF lens 730 may be formed of a dielectric material 732 that has a generally homogeneous dielectric constant throughout the lens structure. The RF lens 730 may also, in some embodiments, include a shell such as a hollow, lightweight structure that holds the dielectric material 732. This is in contrast to a conventional Luneburg lens that is formed of multiple layers of dielectric materials that have different dielectric constants. The lens 730 may be easier and less expensive to manufacture as compared to a Luneburg lens, and may also be more compact. In one embodiment, the RF lens 730 may be formed of a composite dielectric material 732 having a generally uniform dielectric constant of approximately 1.8 and diameter of about 2 wavelengths ($\lambda$) of the center frequency of the signals that are to be transmitted through the radiating elements 712.

In some embodiments, the RF lens 730 may have a circular cylinder shape. In other embodiments, the RF lens 730 may comprise an elliptical cylinder, which may provide additional performance improvements (for example, reduction of the sidelobes of the central beam). Other shapes may also be used.

The RF lens 730 may be formed using any of the composite dielectric materials according to embodiments of the present invention that are discussed above with reference to FIGS. 1-6B and 14-19 (and the above-described variations thereof) as the composite dielectric material 732. The composite dielectric material 732 focuses the RF energy that radiates from, and is received by, the linear arrays 710.

FIG. 8 is a perspective view of one of the linear arrays 710 that is included in the multi-beam base station antenna 700 of FIGS. 7A-7B. The linear array 710 includes a plurality of radiating elements 712, a reflector 750, a phase shifter/divider 718, and two input connectors 790. The phase shifter/divider 718 may be used for beam scanning (beam tilting) in the elevation plane. One or more phase shifter/dividers 718 may be provided for each linear array 710.

FIGS. 9A-9B illustrate the radiating elements 712 in greater detail. In particular, FIG. 9A is a plan view of one of the dual polarized radiating elements 712, and FIG. 9B is a side view of the dual polarized radiating element 712. As shown in FIG. 9A, each radiating element 712 includes four dipoles 714 that are arranged in a square or "box" arrangement. The four dipoles 714 are supported by feed stalks 716, as illustrated in FIG. 9B. Each radiating element 712 may comprise two linear orthogonal polarizations (slant) +45°/−45°.

Figure 10:
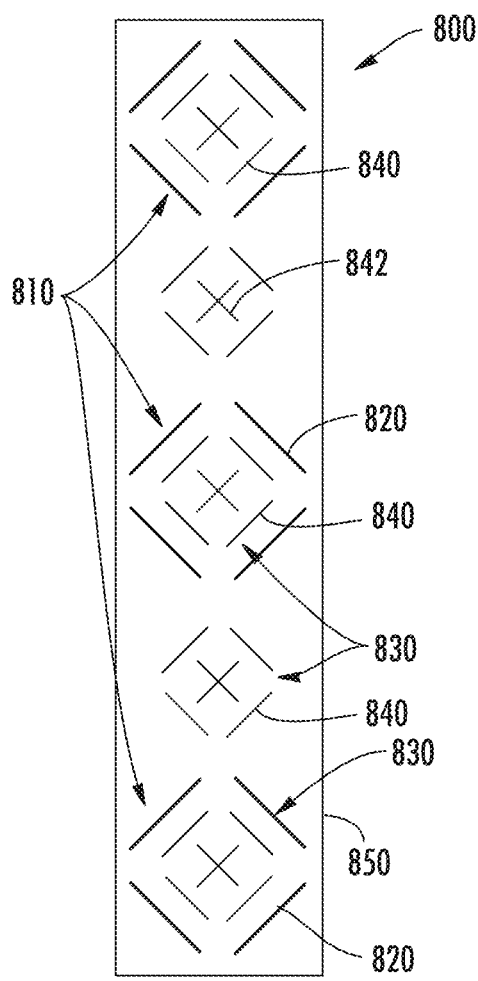
FIG. 10 is a schematic plan view of a dual band antenna that can be used in conjunction with the RF lenses according to embodiments of the present invention.

It will be appreciated that any appropriate radiating elements 712 may be used. For example, in other embodiments, the linear arrays 710 may include box radiating elements that are configured to radiate in different frequency bands, interleaved with each other as shown in U.S. Pat. No. 7,405,710, which is incorporated herein by reference. In these linear arrays, a first array of box-type dipole radiating elements is coaxially disposed within a second box-type dipole assembly and located in one line. This allows a lensed antenna to operate in two frequency bands (for example, 0.79-0.96 and 1.7-2.7 GHz). For the antenna to provide similar beam widths in both frequency bands, the high band radiating elements should have directors. In this case, a low band radiating element may have, for example, a HPBW of 65-50°, and a high band radiating element may have a HPBW of 45-35°, and in the result, the lensed antenna will have stable HPBW of about 23° (and beam width about 40° by −10 dB level) across both frequency bands. FIG. 10 below provides an example of a dual-band antenna that can be used with the lenses according to embodiments of the present invention.

As is further shown in FIG. 7B, the multi-beam base station antenna 700 may also include one or more secondary lenses 740. A secondary lens 740 can be placed between each linear array 710A, 710B, and 710C and the RF lens 730. The secondary lenses 740 may facilitate azimuth beamwidth stabilization. The secondary lenses 740 may be formed of dielectric materials and may be shaped as, for example, rods, cylinders or cubes. Other shapes may also be used.

The use of a cylindrical lens such as lens 730 may reduce grating lobes (and other far sidelobes) in the elevation plane. This reduction is due to the lens 730 focusing the main beam only and defocusing the far sidelobes. This allows increasing spacing between the antenna elements 712. In non-lensed antennas, the spacing between radiating elements in the array may be selected to control grating lobes using the criterion that $d_{max}/\lambda < 1/(\sin\theta_0 + 1)$, where $d_{max}$ is maximum allowed spacing, $\lambda$ is the wavelength and $\theta_0$ is scan angle. In the lensed antenna 700, spacing $d_{max}$ can be increased: $d_{max}/\lambda = 1.2 \sim 1.3[1/(\sin\theta_0 + 1)]$. So, the lens 730 allows the spacing between radiating elements 712 to be increased for the multi-beam base station antenna 300 while reducing the number of radiating elements by 20-30%. This results in additional cost advantages for the multi-beam base station antenna 700.

Referring again to FIGS. 7A and 7B, the radome 760, end caps 770 and tray 780 protect the antenna 700. The radome 760 and tray 780 may be formed of, for example, extruded plastic, and may be multiple parts or implemented as a single piece. In other embodiments, the tray 780 may be made from metal and may act as an additional reflector to improve the front-to-back ratio for the antenna 700. In some embodiments, an RF absorber (not shown) can be placed between the tray 780 and the linear arrays 710 for additional back lobe performance improvement. The lens 730 is spaced such that the apertures of the linear arrays 710 point at a center axis of the lens 730.

The antenna 700 of FIGS. 7A-7B has an RF lens 730 that has a flat top and a flat bottom, which may be convenient for manufacturing and/or assembly. However, it will be appreciated that in other embodiments an RF lens may be used instead that has rounded (hemispherical) ends. The hemispherical end portions may provide additional focusing in the elevation plane for the radiating elements 712 at the respective ends of the linear arrays 710. This may improve the overall gain of the antenna.

It will likewise be appreciated that the lenses according to embodiments of the present invention may be used in dual and/or multiband base station antennas. Such antennas may include, for example antennas providing ports for transmission and reception in the 698-960 MHz frequency band as well as in the 1.7-2.7 GHz frequency band or, as another example, in both the 1.7-2.7 GHz frequency band and the 3.4-3.8 GHz frequency band. A homogeneous cylindrical RF lens works well when its diameter D=1.5–6λ (where λ is the wavelength in free space of the center frequency of the transmitted signal). Consequently, such lenses may be used with respect to the above example frequency bands as the diameter of the lens may be selected so that the lens will perform well with respect to both frequency bands. In order to provide the same azimuth beamwidth for both bands (if desired in a particular application), the azimuth beam width of the low band linear array (before passing through the RF lens) may be made to be wider than the azimuth beam width of the high band linear array, approximately in proportion to a ratio of the center frequencies of the two bands.

FIG. 10 schematically illustrates an example configuration for the radiating elements of low band and high band arrays that may be used in example dual-band multi-beam lensed antennas according to further embodiments of the present invention. The linear array 800 shown in FIG. 10 may, for example, be used in place of the linear arrays 710 in the antenna 700 of FIGS. 7A-7B.

As shown in FIG. 10, in one configuration, low band radiating elements 820 that form a first linear array 810 and high band radiating elements 840 that form a second linear array 830 may be mounted on a reflector 850. The radiating elements 820, 840 may be arranged together in a single column so that the linear arrays 810, 830 are collinear and interspersed. In the depicted embodiments, both the low band radiating elements 820 and the high band radiating elements 840 are implemented as box-type dipole elements. In the depicted embodiment, each high band element 840 includes directors 842 which narrow the azimuth beamwidth of the high band radiating elements. For example, in one embodiment, the low band linear array 810 has an azimuth HPBW of about 65°-75° and the high band linear array 830 has an azimuth HPBW of about 40°, and the resulting HPBW of the multi-beam lensed antenna is about 23° in both frequency bands.

Figure 11:
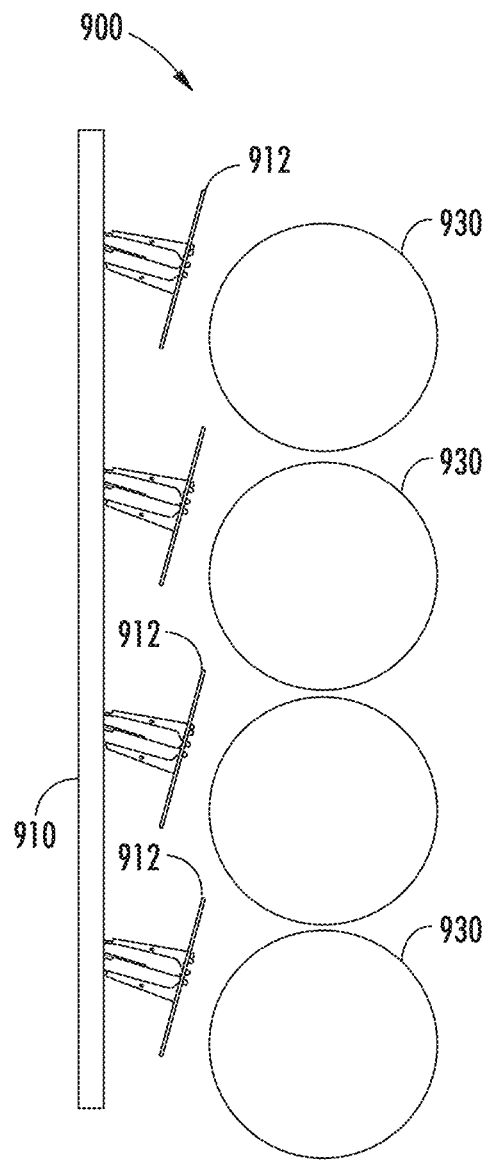
FIG. 11 is a schematic side view of a base station antenna according to further embodiments of the present invention that includes a plurality of spherical lenses.

FIG. 11 is a schematic side view of a lensed base station antenna 900 according to further embodiments of the present invention. As shown in FIG. 11, the base station antenna 900 comprises a single-column phased array antenna 900 that includes a spherical RF lens for each radiating element. Referring to FIG. 11, the antenna 900 includes a plurality of radiating elements 912 that are mounted on a mounting structure 910. The antenna 900 further includes a plurality of RF lenses 930. The RF lenses 930 may be mounted in a first column. The first column may extend in a direction that is substantially perpendicular to a plane defined by the. The radiating elements 912 may be mounted in a second column. When the antenna 900 is mounted for use, the azimuth plane is perpendicular to the longitudinal axis of the antenna 900, and the elevation plane is parallel to the longitudinal axis of the antenna 900. The radiating elements 912 may comprise any suitable radiating element including, for example, any of the radiating elements described above.

As shown in FIG. 11, each radiating element 912 may be associated with a respective one of the spherical RF lens 930 in that each radiating element 912 is configured to emit a radiation beam through its associated RF lens 930. The combination of a radiating element 912 and its associated spherical RF lens 930 may provide a radiation pattern that is narrowed in both the azimuth and elevation directions. For an antenna operating at about 2 GHz, a 220 mm spherical RF lens 930 may be used to generate an azimuth half power beamwidth of about 35 degrees. The spherical RF lens 930 may include (e.g., be filled with or consist of), for example, any of the composite dielectric materials described herein. The dielectric material of the spherical RF lens 930 focuses the RF energy that radiates from, and is received by, the associated radiating element 912.

Each spherical RF lens 930 is used to focus the coverage pattern or "beam" emitted by its associated radiating element 912 in both the azimuth and elevation directions by a desired amount. In one example embodiment, the array of spherical RF lens 930 may shrink the 3 dB beamwidth of the composite beams output by the single-column phased array antenna 900 from about 65° to about 23° in the azimuth plane. By narrowing the half power beam width of the single-column phased array antenna 900, the gain of the antenna may be increased by, for example, about 4-5 dB in example embodiments. In other embodiments, the diameter of the RF lens may be changed to achieve more or less narrowing of the antenna beam, with larger diameter lenses shrinking the antenna beam more than smaller diameter lenses. As another example, the RF lenses according to embodiments of the present invention may be used to shrink the 3 dB beamwidth of the composite beam output by a phased array antenna from about 65° to about 33° in the azimuth plane.

It will also be appreciated that the amount that an RF lens shrinks the beamwidth of an antenna beam that passes therethrough varies with the frequency of the signals being transmitted and received by the antenna. In particular, the larger the number of wavelengths that an RF signal cycles through in passing through the lens, the more focusing that will occur with respect to the antenna beam. For example, a particular RF lens will shrink a 2.7 GHz beam more than a 1.7 GHz beam.

There are a number of antenna applications in which signals in multiple different frequency ranges are transmitted through the same antenna. One common example is multi-band base station antennas for cellular communications systems. Different types of cellular service are supported in different frequency bands, such as, for example, GSM service which uses the 900 MHz (namely 990-960 MHz) and 1800 MHz (namely 1710-1880 MHz) frequency bands, UTMS service which uses the 1920-2170 MHz frequency band, and LTE service which uses the 2.5-2.7 GHz frequency band. A single base station antenna may have multiple arrays of different types of radiating elements that support two or more different types of cellular service and/or may have wideband radiating elements that transmit and receive signals for multiple different types of service.

When an RF lens is used with such antennas (and where it is not possible or practical to use different RF lenses for different types of radiating elements), a Luneburg lens may be used to partially offset the effect that the difference in frequency has on the beamwidth of the antenna beams for the different frequency bands. However, in some cases, even when a Luneburg lens is used, the beam for the high frequency band may be more tightly focused than the beam for the lower frequency band. This may cause difficulties, since RF planners often want the coverage areas to be the same for each frequency band, or at least for all frequencies that are serviced by a particular column of radiating elements.

Figure 12:
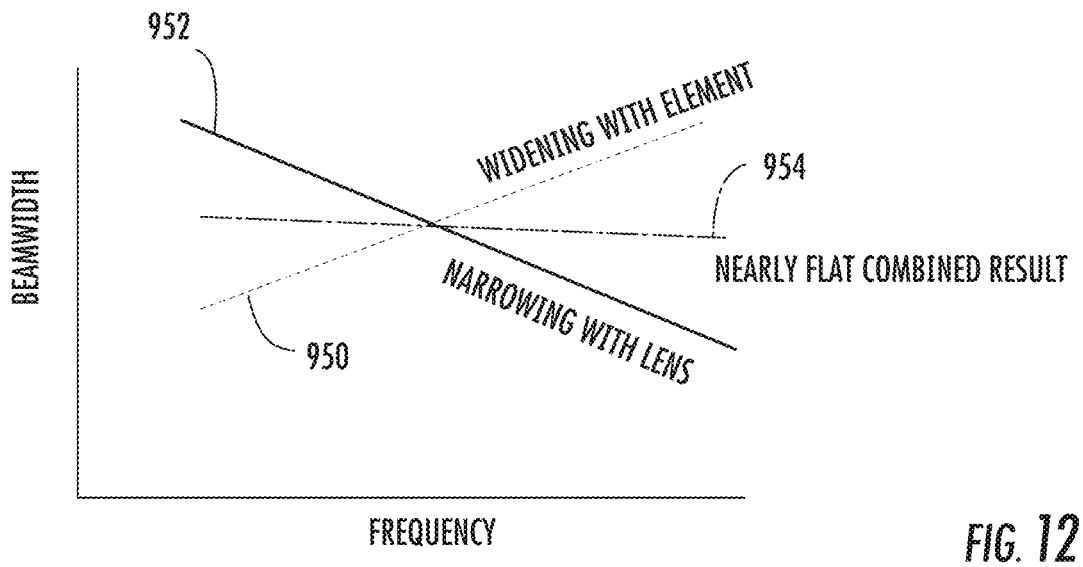
FIG. 12 is a graph illustrating how radiating elements with frequency dependent beamwidths may be used to offset the narrowing of beamwidth with frequency that can occur with RF lenses.

Pursuant to further embodiments of the present invention, antennas are provided that have radiating elements that have a beamwidth that increases with frequency which can be used to offset the narrowing effect that an RF lens may have on beamwidth as a function of frequency. FIG. 12 is a graph that illustrates how such radiating elements that have beamwidths that increase with increasing frequency can be used to offset the narrowing of beamwidth that may occur in an RF lens. In FIG. 12, curve 950 illustrates the beamwidth of the radiating elements of the antenna as a function of frequency while curve 952 illustrates the effect of the RF lens on the beamwidth as a function of frequency. Curve 954 represents the combination of curves 950 and 952, showing that the use of radiating elements that have a beamwidth that varies as a function of frequency may be used in conjunction with an RF lens to provide antenna beams that are relatively constant over a broad frequency range.

In light of the above, it will be appreciated that the antennas according to embodiments of the present invention may be multiband antennas that include multiple columns of different types/sizes of radiating elements that are designed to transmit/receive signals in different frequency bands and/or antennas that have wideband radiating elements that are designed to transmit and receive signals in multiple different frequency bands. In some embodiments, these antennas may include radiating elements that are designed to have a beamwidth that varies as a function of frequency in the manner described above. In some embodiments, this variation may be relatively linear across the frequency bands of interest. These antennas according to embodiments of the present invention may use any of the RF lenses described herein.

The RF lenses 930 may be mounted so that they are generally aligned along a first vertical axis, and the radiating elements 912 may be mounted so that they are generally aligned along a second vertical axis that extends in parallel to the second vertical axis. As shown in FIG. 11, a center of each radiating element 912 may be positioned vertically along the second vertical axis at a point that is higher than a center of its associated spherical RF lens 930 is positioned along the first vertical axis. Each radiating element 912 may be positioned with respect to its associated spherical RF lens 930 so that a center of a radiation pattern that is emitted by the radiating element 912, when excited, is directed at a center point of its associated spherical RF lens 930. Each radiating element 912 may be positioned at the same distance from its associated spherical RF lens 930 as are the other radiating elements 912 with respect to their associated spherical RF lenses 930.

In some embodiments, each radiating element 912 may be angled with respect to the second vertical axis. In particular, each radiating element 912 may be mechanically angled downwardly or "downtilted" with respect to the second vertical axis. For example, each radiating element 912 may be mechanically angled downward from the horizontal by 5 degrees. Additionally, each radiating element 912 may be arranged orbitally with respect to its associated spherical RF lens 930 (i.e., pointed toward the center of the spherical RF lens 930).

Several advantages may be realized in an antenna comprising an array of radiating elements and individual spherical RF lenses associated with each radiating element. For example, as discussed above, narrowed half power beamwidths may be achieved in both the azimuth and elevation directions with fewer radiating elements. For example, a single column of five radiating elements and associated spherical RF lenses may produce an azimuth HPBW of 30-40 degrees and an elevation HPBW of less than 10 degrees. Thus, the antenna may benefit from reduced cost, complexity and size. Also, less dielectric material is required to form a linear array of spherical RF lenses 930 as compared to a single cylindrical lens that is shared by all of the radiating elements 912. The lens volume=$4/3*\pi*r^3$ for each spherical RF lens 930, where "r" is the radius of the sphere. For example, for an antenna that includes four radiating elements and spherical lenses that has a length L=8r, the total volume of the spherical RF lenses would be $16/3*n*r^3$, while the volume of an equivalent cylindrical lens would be $8*\pi*r^3$, or 1.33 times more. The spherical RF lenses 930 also provide an additional benefit of improved cross polarization performance.

Pursuant to embodiments of the present invention, various composite dielectric materials are provided that may be used to form RF lens that are suitable for use with base station antennas and/or other multi-beam and/or phased array antennas. Many of the composite dielectric materials disclosed herein include a lightweight base dielectric material that is coupled with a high dielectric constant dielectric material or a conductive material. Suitable lightweight base dielectric materials include, for example, melamine foam, polystyrene foam beads, layered foams, foamed polymer composites, foamed paste and air dielectrics (i.e., in embodiments where the high dielectric constant material or conductor is self-supporting the base dielectric material may simply be air). Suitable high dielectric constant dielectric material or conductive materials include glitter, flitter, metal foils, wires, carbon black and/or high dielectric constant powders such as ceramic or metal oxide powders. It will be appreciated that these materials may be combined in any way to provide additional embodiments, and that the embodiments described above with reference to the figures may similarly be combined in any way to provide yet additional embodiments.

Figure 13:
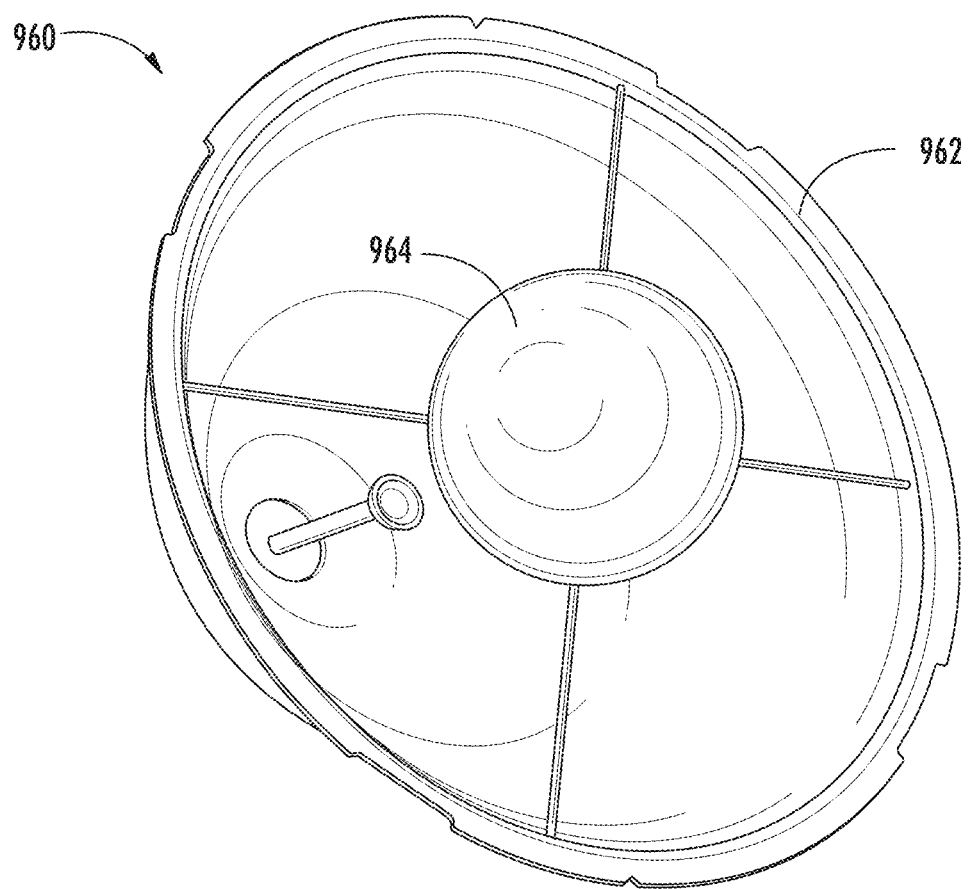
FIG. 13 is a schematic view of a lensed reflector antenna according to embodiments of the present invention.

While the description above has primarily focused on using RF lenses with base station antennas in cellular communications systems, it will readily be appreciated that the RF lenses disclosed herein and the composite dielectric materials included in these disclosed RF lenses may be used in a wide variety of other antenna applications, specifically including any antenna applications that use a phased array antenna, a multi-beam antenna or a reflector antenna such as parabolic dish antennas. By way of example, backhaul communications systems for both cellular networks and the traditional public service telephone network use point-to-point microwave antennas to carry high volumes of backhaul traffic. These point-to-point systems typically use relatively large parabolic dish antennas (e.g., parabolic dishes having diameters in the range of, perhaps, one to six feet), and may communicate with similar antennas over links of less than a mile to tens of miles in length. By providing more focused antenna beams, the sizes of the parabolic dishes may be reduced, with attendant decreases in cost and antenna tower loading, and/or the gain of the antennas may be increased, thereby increasing link throughput. Thus, it will be appreciated that embodiments of the present invention extend well beyond base station antennas and that the RF lenses disclosed herein can be used with any suitable antenna. As an example, FIG. 13 illustrates a lensed antenna 960 that includes a parabolic reflector antenna 962 and a spherical RF lens 964, where the RF lens 964 may be any of the RF lenses disclosed herein.

It will also be appreciated that parabolic reflector antennas for microwave backhaul systems are just another example of applications where the RF lenses disclosed herein may be used to improve the performance of a communications system. Other non-limiting examples include directive antennas on airplanes, ships, moving vehicles and the like. The RF lenses may likewise be used on radar system antennas, satellite communications antennas (on both ground-based and satellite-based antennas) or any other application that uses a dish antenna or a multi-element array antenna. In such applications, the RF lenses disclosed herein may be used to make the antenna smaller and lighter and/or may be used to increase the gain of the antenna.

It will be appreciated that numerous modifications may be made to the above-described embodiments without departing from the scope of the present invention. For example, with respect to the lightweight composite dielectric materials that are described above that are formed as small blocks that are used to build the lens, it will be understood that different high dielectric constant materials may be used for different blocks and/or within the same blocks. Likewise, different blocks may include different lightweight base dielectric materials.

While the foregoing examples are described with respect to one beam and three beam antennas, additional embodiments including, for example, antennas having 2, 4, 5, 6 or more beams are also contemplated. It will also be appreciated that the lens may be used narrow at least the azimuth beam of a base station antenna from a first value to a second value. The first value may comprise, for example, about 90°, 65° or a wide variety of other azimuth beamwidths. The second value may comprise about 65°, 45°, 33°, 25°, etc. It will also be appreciated that in multi-band antennas according to embodiments of the present invention the degree of narrowing can be the same or different for the linear arrays of different frequency bands.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A lensed antenna, comprising:
an array of radiating elements; and
a lens positioned to receive electromagnetic radiation from at least one of the radiating elements, the lens comprising a composite dielectric material,
wherein the composite dielectric material comprises:
a unitary block of a first foamed material, the first foamed material having a reticular structure, wherein the reticular structure is a net structure having a three-dimensional matrix of strands comprising connected perimeter segments surrounding cell spaces;
a binder; and
a plurality of particles of a second material that are randomly dispersed throughout an interior of the unitary block of the first foamed material within the reticular structure,
wherein the second material is a dielectric material having a dielectric constant that is greater than a dielectric constant of the first foamed material,
wherein the binder binds the particles of the second material within the cell spaces of the first foamed material.

2. The lensed antenna of claim 1, wherein the particles of the second material comprise at least one of carbon black particles, ceramic dielectric particles and non-conductive metal oxide particles.

3. The lensed antenna of claim 1, wherein the binder includes polyurethane or polyvinyl butyral.

4. The lensed antenna of claim 1, further comprising a lens container, wherein the composite dielectric material of the lens is held inside the lens container, and wherein the unitary block is greater than 50% air by volume.

5. A lensed antenna, comprising:
a plurality of radiating elements; and
a lens positioned to receive electromagnetic radiation from at least one of the radiating elements, the lens comprising a composite dielectric material,
wherein the composite dielectric material has a density in a range of 0.005 to 0 g/cm$^3$, a dielectric constant in a range of 1-3, and comprises a plurality of particles of a first material interspersed between a plurality of foamed dielectric particles,
wherein the first material has a higher dielectric constant than the foamed dielectric particles,
wherein the first material comprises pieces of sheets of conductive material that are covered on at least two sides with a layer of an insulating material in a thickness in a range of 0.5-25 microns, and
wherein the foamed dielectric particles are larger than the conductive material in at least one dimension.

6. The lensed antenna of claim 5, wherein the foamed dielectric particles are equiaxed foamed dielectric particles.

7. The lensed antenna of claim 5, wherein the pieces of the sheets of conductive material are metal with a thickness in a range of 1-25 microns.

8. The lensed antenna of claim 5, further comprising a first binder that is provided by a material different from the insulating material.

9. A lensed antenna, comprising:
an array of radiating elements; and
a lens positioned to receive electromagnetic radiation from at least one of the radiating elements, the lens comprising a composite dielectric material,
wherein the composite dielectric material comprises:
a cured foamed polymer material having a cellular structure; and
particles dispersed throughout the interior of the cured foamed polymer material,
wherein the particles are encapsulated within cells of the cured foamed polymer material,
wherein each particle comprises a sheet of conductive material having an insulating material on both major surfaces thereof, and
wherein the sheets of conductive material comprise at least one of glitter flakes and flitter flakes.

10. The lensed antenna of claim 9, wherein the cured foamed polymer material comprises a cured resin.

11. The lensed antenna of claim 10, wherein the cured foamed polymer material has a closed cell foam structure and the particles are encapsulated within the closed cell foam structure of the cured foamed polymer material.

* * * * *

UNITED STATES PATENT AND TRADEMARK OFFICE
CERTIFICATE OF CORRECTION

PATENT NO. : 11,431,100 B2
APPLICATION NO. : 15/882505
DATED : August 30, 2022
INVENTOR(S) : Galla et al.

It is certified that error appears in the above-identified patent and that said Letters Patent is hereby corrected as shown below:

In the Claims

Column 31, Line 11, Claim 5: Please correct "0 g/cm$^3$" to read --0.2 g/cm$^3$--

Signed and Sealed this
Twenty-second Day of November, 2022

Katherine Kelly Vidal
Director of the United States Patent and Trademark Office